(12) United States Patent
Lee et al.

(10) Patent No.: US 11,452,088 B2
(45) Date of Patent: Sep. 20, 2022

(54) METHOD AND APPARATUS FOR CONFIRMATION OF MULTIPLE CONFIGURED GRANTS FOR SIDELINK IN A WIRELESS COMMUNICATION SYSTEM

(71) Applicant: LG ELECTRONICS INC., Seoul (KR)

(72) Inventors: Youngdae Lee, Seoul (KR); JaYeong Kim, Seoul (KR); Giwon Park, Seoul (KR); Jongyoul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 63 days.

(21) Appl. No.: 17/098,206

(22) Filed: Nov. 13, 2020

(65) Prior Publication Data
US 2021/0153176 A1     May 20, 2021

(30) Foreign Application Priority Data
Nov. 15, 2019    (KR) .......................... 10-2019-0146837

(51) Int. Cl.
| | |
|---|---|
| *H04W 72/04* | (2009.01) |
| *H04W 72/14* | (2009.01) |
| *H04W 4/40* | (2018.01) |
| *H04W 72/10* | (2009.01) |

(52) U.S. Cl.
CPC ........... *H04W 72/042* (2013.01); *H04W 4/40* (2018.02); *H04W 72/10* (2013.01); *H04W 72/14* (2013.01)

(58) Field of Classification Search
CPC ..... H04W 72/042; H04W 4/40; H04W 72/10; H04W 72/14; H04W 76/14
See application file for complete search history.

(56) References Cited

U.S. PATENT DOCUMENTS

| | | | |
|---|---|---|---|
| 2018/0048994 A1* | 2/2018 | Kwon | ..................... H04W 4/08 |
| 2018/0139734 A1* | 5/2018 | Babaei | .............. H04W 72/0406 |
| 2020/0053820 A1* | 2/2020 | Chin | ................ H04W 72/1242 |
| 2020/0053835 A1* | 2/2020 | Ye | .......................... H04L 1/0003 |
| 2020/0146082 A1* | 5/2020 | Chen | ................. H04W 28/0278 |

FOREIGN PATENT DOCUMENTS

| | | | | |
|---|---|---|---|---|
| WO | WO-2018171927 A1 * | 9/2018 | ........... | H04L 1/1812 |
| WO | WO-2018174770 A1 * | 9/2018 | ........ | H04W 72/0406 |

* cited by examiner

*Primary Examiner* — Dinh Nguyen
(74) *Attorney, Agent, or Firm* — Lee Hong Degerman Kang & Waimey

(57) ABSTRACT

A method and apparatus for confirmation of multiple configured grants for sidelink in a wireless communication system is provided. A wireless device receives activation command or deactivation command on Physical Downlink Control Channel (PDCCH) for at least one of the multiple configured grants. A wireless device receives transmits, to the network, a confirmation Media Access Control (MAC) Control Element (CE). The confirmation MAC CE includes one or more fields in a bit group of which size is equal to number of the multiple configured grants. Each field in the bit group is set to (i) zero to indicate deactivation for each of the multiple configured grants or (ii) 1 to indicate activation for each of the multiple configured grants. Each field in the confirmation MAC CE except the bit group is ignored.

14 Claims, 16 Drawing Sheets

METHOD AND APPARATUS FOR CONFIRMATION OF MULTIPLE CONFIGURED GRANTS FOR SIDELINK IN A WIRELESS COMMUNICATION SYSTEM

CROSS-REFERENCE TO RELATED APPLICATIONS

Pursuant to 35 U.S.C. § 119 (a), this application claims the benefit of earlier filing and right of priority to Korean Patent Application No. 10-2019-0146837, filed on Nov. 15, 2019, the contents of which are all hereby incorporated by reference herein in its entirety.

TECHNICAL FIELD

The present disclosure relates to a method and apparatus for confirmation of multiple configured grants for sidelink in a wireless communication system.

RELATED ART

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Vehicle-to-everything (V2X) communication is the passing of information from a vehicle to any entity that may affect the vehicle, and vice versa. It is a vehicular communication system that incorporates other more specific types of communication as vehicle-to-infrastructure (V2I), vehicle-to-network (V2N), vehicle-to-vehicle (V2V), vehicle-to-pedestrian (V2P), vehicle-to-device (V2D) and vehicle-to-grid (V2G).

SUMMARY

A wireless device may establish a unicast link and the associated PC5-RRC connection with another wireless device in sidelink.

When a wireless device receives activation or deactivation command for a configured grant (CG), the wireless device may trigger the configured grant confirmation and generate the Configured Grant Confirmation MAC Control Element (MAC CE) to transmit to the network. If a CG is activated, the wireless device may transmit data transmission by using the CG.

If multiple configuration grants are activated or deactivated, UE may trigger multiple CG confirmations. In this case, UE may transmit many confirmations to the network, which may cause the network to be confused. There could be mismatch between UE and the network regarding whether a particular CG is activated or deactivated.

Therefore, studies for confirmation of multiple configured grants for sidelink in a wireless communication system are required.

In an aspect, a method performed by a wireless device in a wireless communication system is described. A wireless device receives activation command or deactivation command on Physical Downlink Control Channel (PDCCH) for at least one of the multiple configured grants. A wireless device receives transmits, to the network, a confirmation Media Access Control (MAC) Control Element (CE). The confirmation MAC CE includes one or more fields in a bit group of which size is equal to number of the multiple configured grants. Each field in the bit group is set to (i) zero to indicate deactivation for each of the multiple configured grants or (ii) 1 to indicate activation for each of the multiple configured grants. Each field in the confirmation MAC CE except the bit group is ignored.

In another aspect, an apparatus for implementing the above method is provided.

The present disclosure can have various advantageous effects.

According to some embodiments of the present disclosure, a wireless device could confirm multiple configured grants for sidelink efficiently.

For example, a wireless device could efficiently confirm to activation or deactivation of a configured grant.

For example, a wireless device could confirm to activation or deactivation of a configured grant by using a MAC CE.

For example, a wireless device could efficiently allocate a resource for transmission of the configured grant.

For example, a wireless device could allocate a resource for transmission of the configured grant when the wireless device uses a configured grant for transmission.

According to some embodiments of the present disclosure, a wireless communication system could provide a method for efficiently confirming activation or deactivation for a configured grant for a wireless device performing transmission or reception.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DESCRIPTION OF EXEMPLARY EMBODIMENTS

Figure 1:
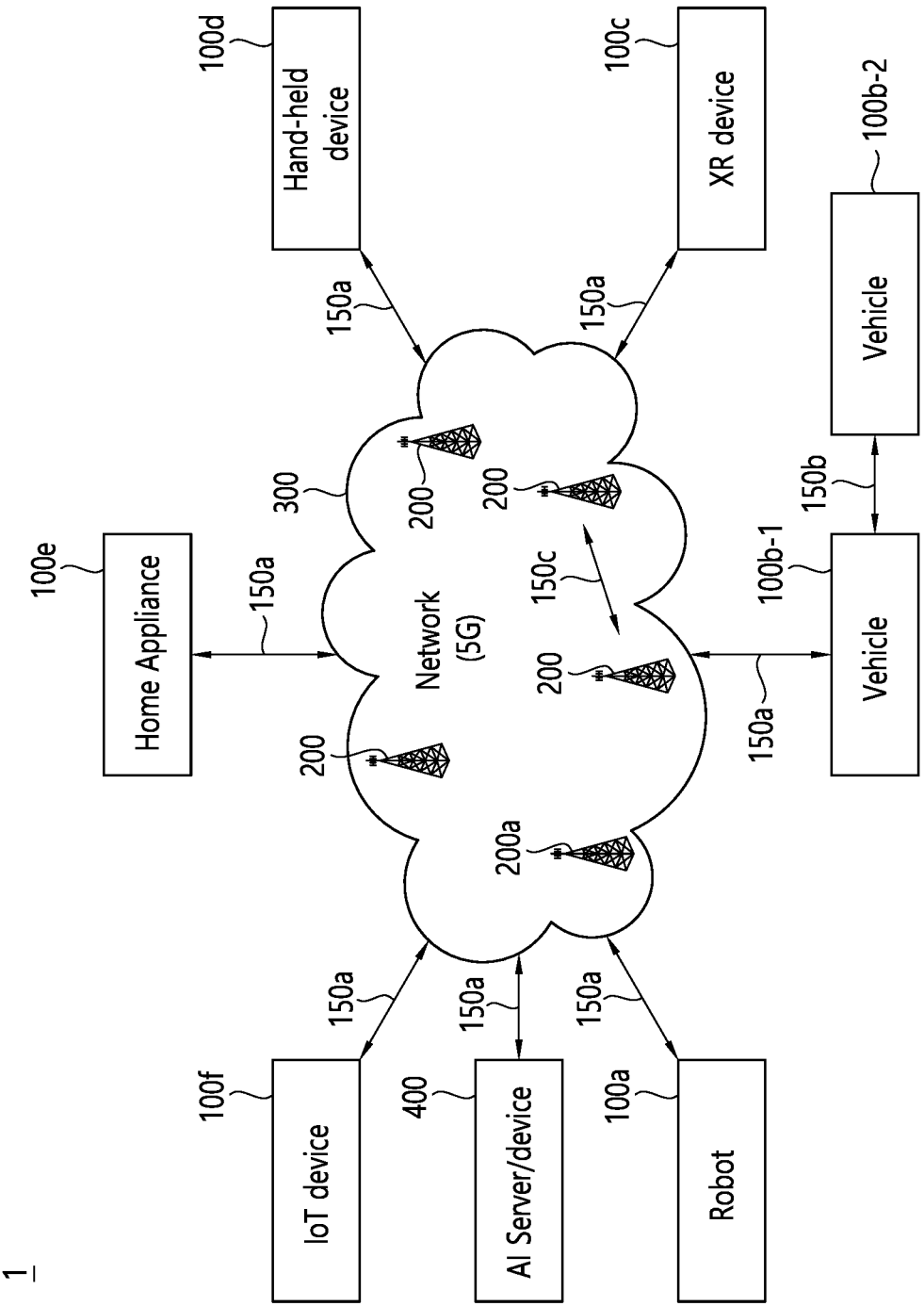
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is a part of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified.

Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
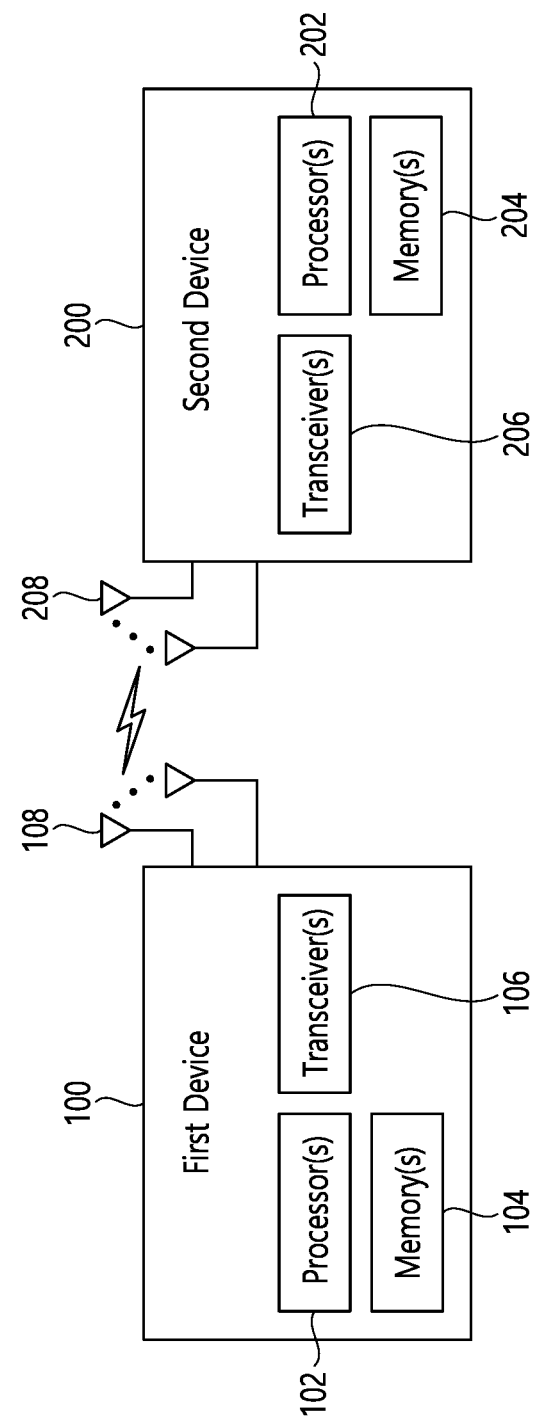
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
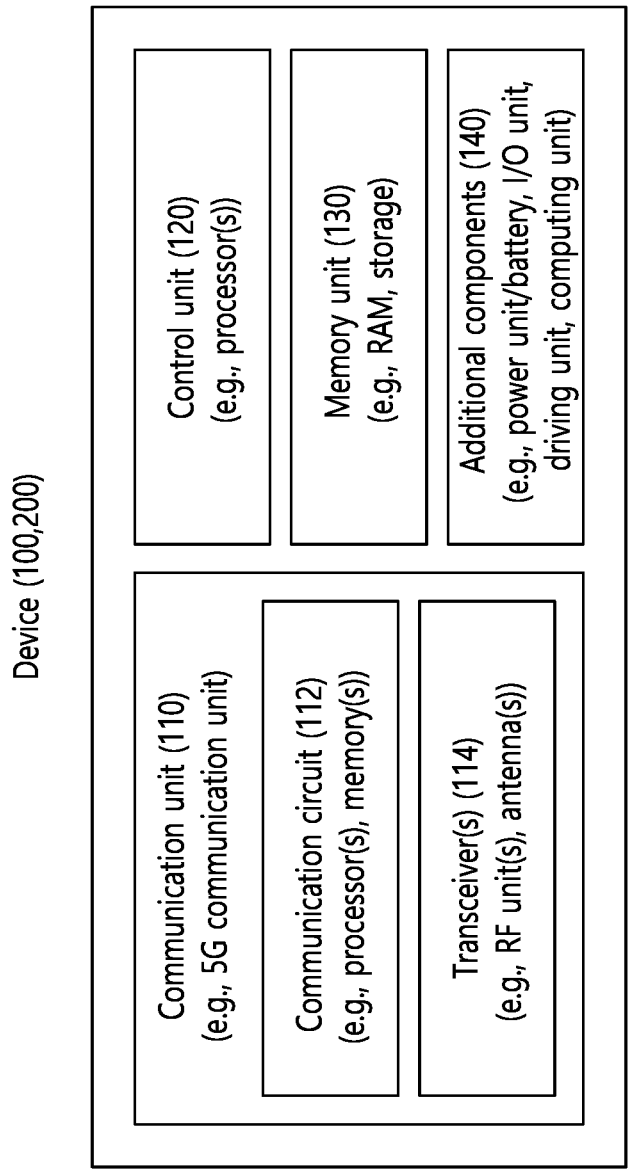
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BS s (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
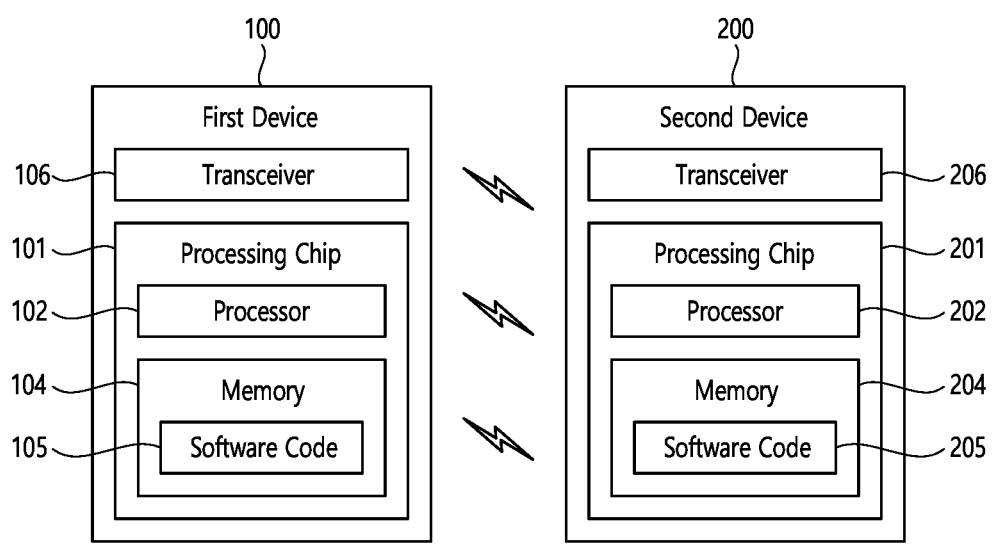
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
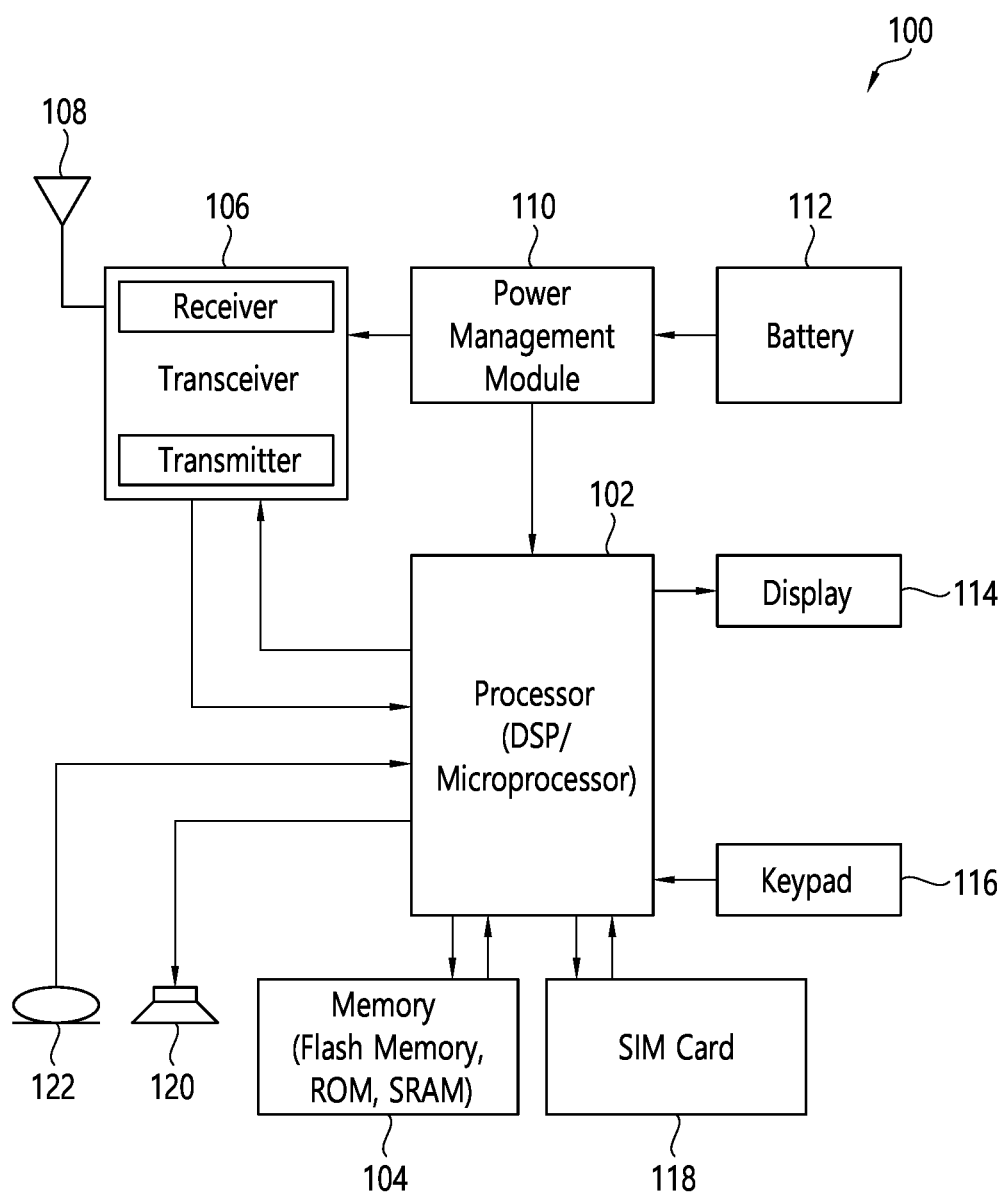
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
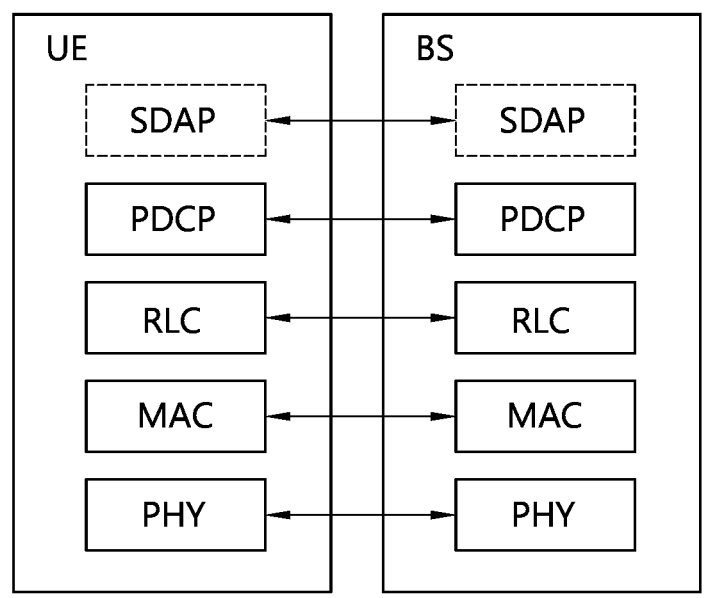
FIGS. 6 and 7 show an example of protocol stacks in a 3GPP based wireless communication system to which implementations of the present disclosure is applied.
Figure 7:
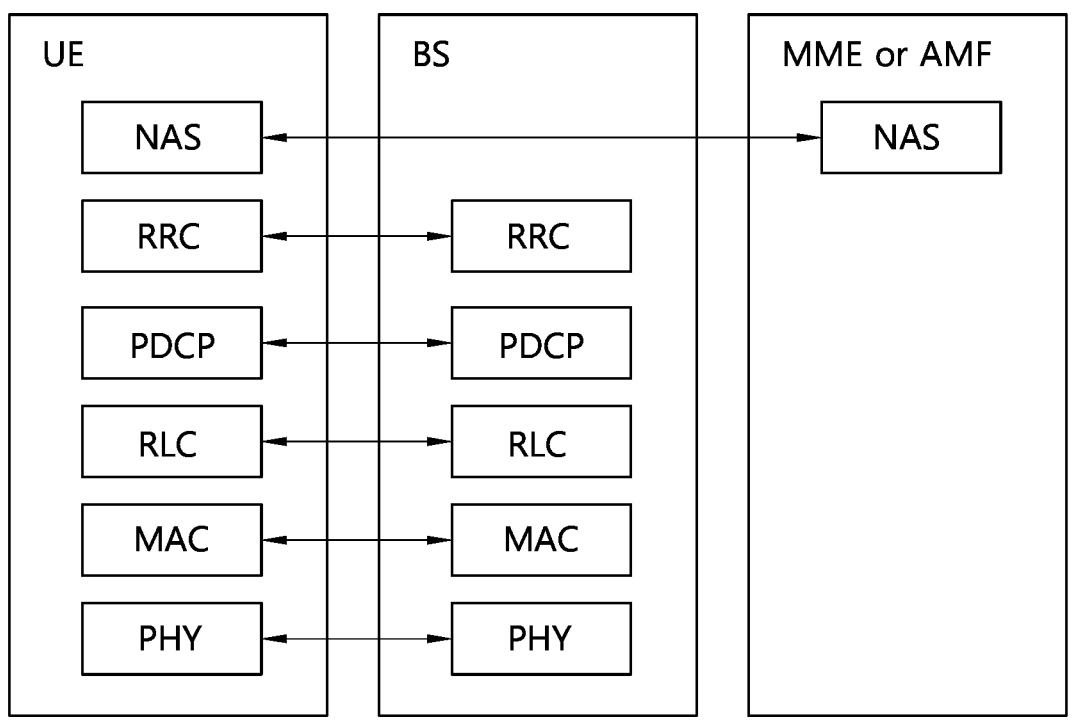

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode™, unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
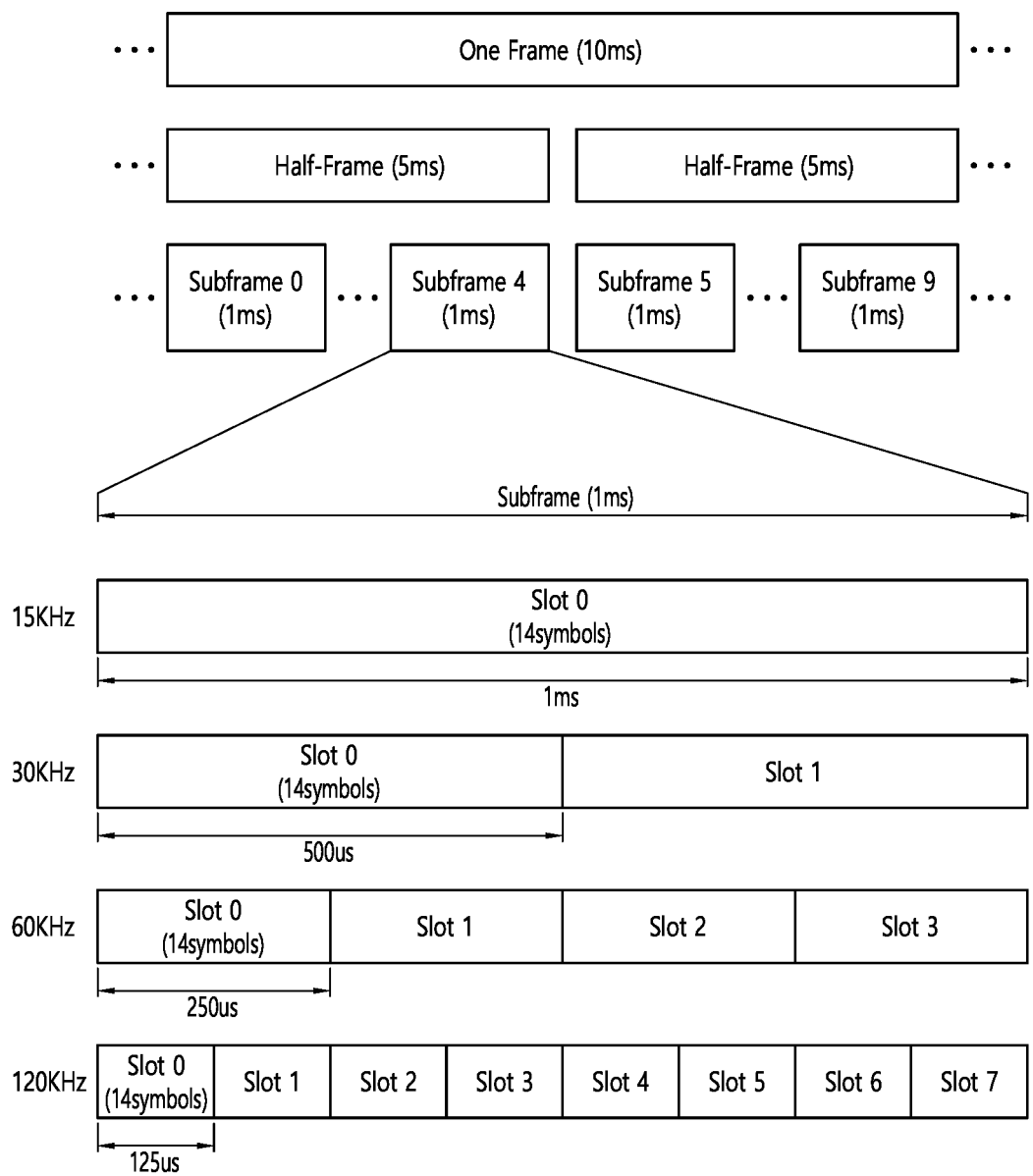
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f=10$ ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f = 2^u * 15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f = 2^u * 15$ kHz.

TABLE 1

| u | $N^{slot}_{symb}$ | $N^{frame, u}_{slot}$ | $N^{subframe, u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f = 2^u * 15$ kHz.

TABLE 2

| u | $N^{slot}_{symb}$ | $N^{frame, u}_{slot}$ | $N^{subframe, u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x} * N^{RB}_{sc}$ subcarriers and $N^{subframe,u}_{symb}$ OFDM symbols is defined, starting at common resource block (CRB) $N^{start,u}_{grid}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain.

In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB} = n_{CRB} + N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times.

In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
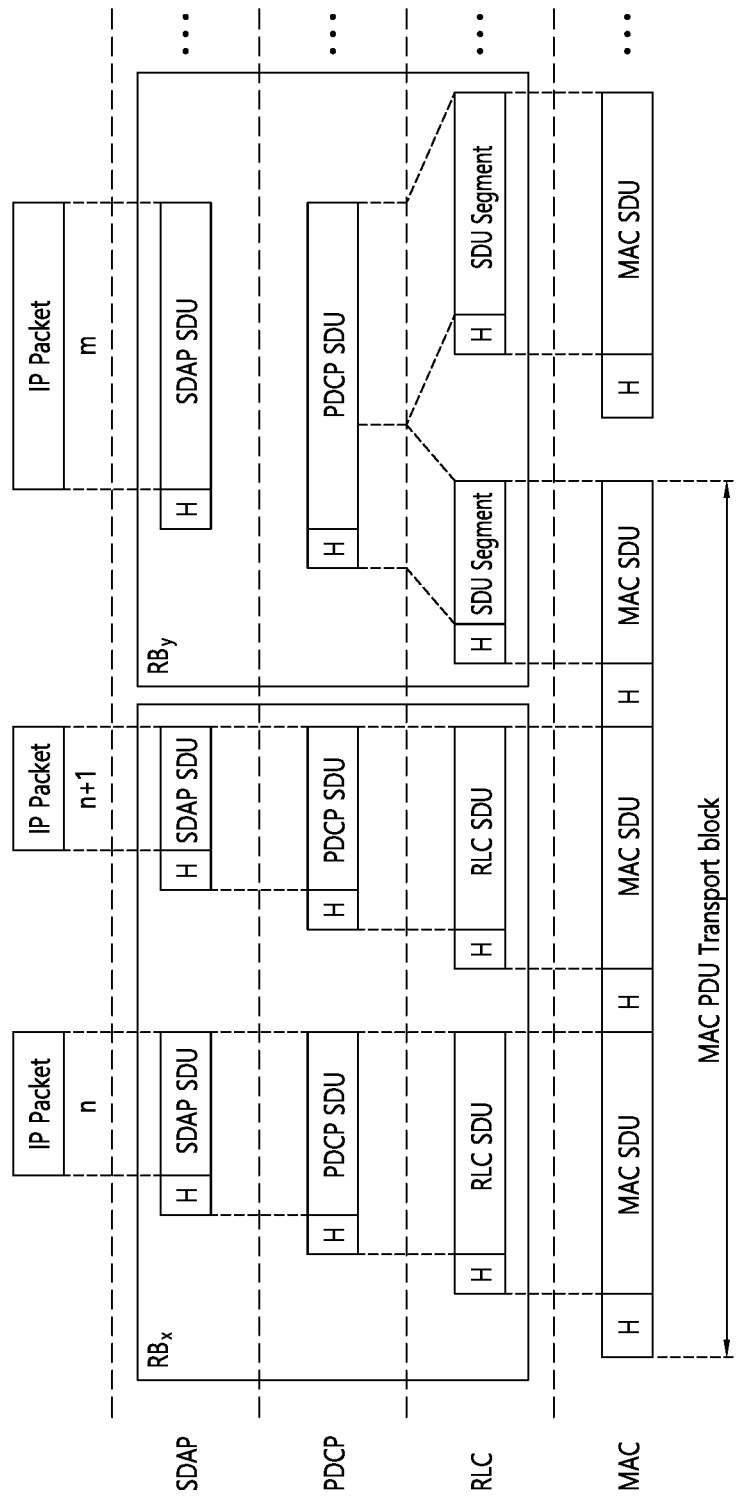
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Support for vehicle-to-vehicle (V2V) and vehicle-to-everything (V2X) services has been introduced in LTE during Releases 14 and 15, in order to expand the 3GPP platform to the automotive industry. These work items defined an LTE sidelink suitable for vehicular applications, and complementary enhancements to the cellular infrastructure.

Further to this work, requirements for support of enhanced V2X use cases have been defined in 5G LTE/NR, which are broadly arranged into four use case groups:

1) Vehicles platooning enables the vehicles to dynamically form a platoon travelling together. All the vehicles in the platoon obtain information from the leading vehicle to manage this platoon. These information allow the vehicles to drive closer than normal in a coordinated manner, going to the same direction and travelling together.

2) Extended Sensors enables the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.

3) Advanced driving enables semi-automated or full-automated driving. Each vehicle and/or RSU shares its own perception data obtained from its local sensors with vehicles in proximity and that allows vehicles to synchronize and coordinate their trajectories or maneuvers. Each vehicle shares its driving intention with vehicles in proximity too.

4) Remote driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

NR sidelink (SL) unicast, groupcast, and broadcast design is described. SL broadcast, groupcast, and unicast transmissions are supported for the in-coverage, out-of-coverage and partial-coverage scenarios.

Figure 10:
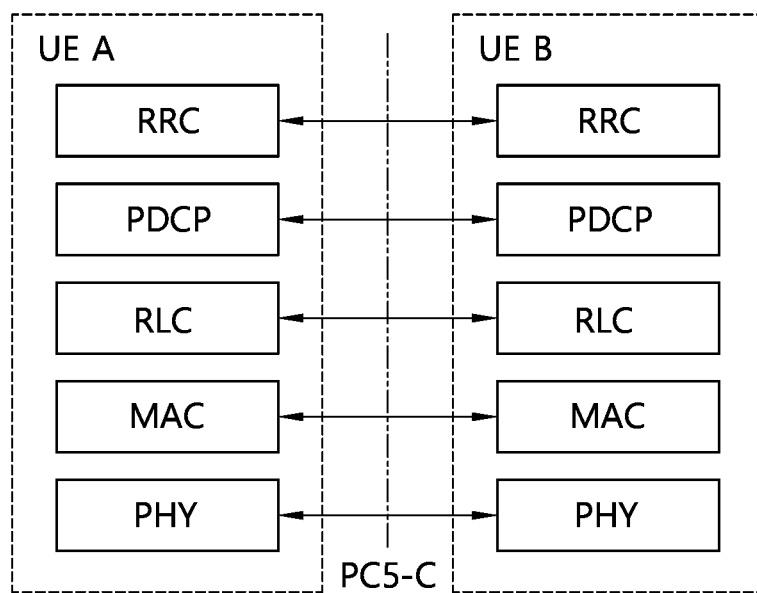
FIGS. 10 and 11 show an example of PC5 protocol stacks to which implementations of the present disclosure is applied.
Figure 11:
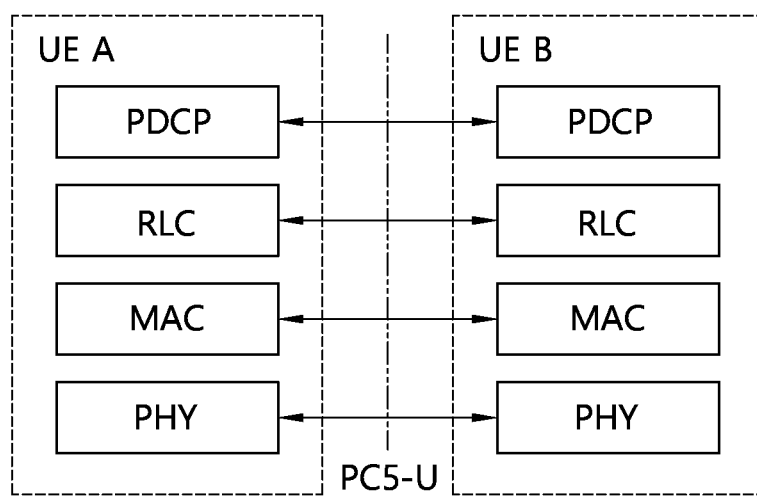

FIGS. 10 and 11 show an example of PC5 protocol stacks to which implementations of the present disclosure is applied.

FIG. 10 illustrates an example of a PC5 control plane (PC5-C) protocol stack between UEs. The AS protocol stack for the control plane in the PC5 interface consists of at least RRC, PDCP, RLC and MAC sublayers, and the physical layer.

FIG. 11 illustrates an example of a PC5 user plane (PC5-U) protocol stack between UEs. The AS protocol stack for user plane in the PC5 interface consists of at least PDCP, RLC and MAC sublayers, and the physical layer.

For the purposes of physical layer analysis, it is assumed that higher layers decide if unicast, groupcast, or broadcast transmission is to be used for a particular data transfer, and they correspondingly inform the physical layer. When considering a unicast or groupcast transmission, it is assumed that the UE is able to establish which unicast or groupcast session a transmission belongs to, and that the following identities is known to the physical layer:

The layer-1 destination ID, conveyed via physical sidelink control channel (PSCCH)

Additional layer-1 ID(s), conveyed via PSCCH, at least for the purpose of identifying which transmissions can be combined in reception when HARQ feedback is in use HARQ process ID For the purpose of Layer 2 analysis, it is assumed that upper layers (i.e., above AS) provide the information on whether it is a unicast, groupcast or broadcast transmission for a particular data transfer. For the unicast and groupcast transmission in SL, the following identities is known to Layer 2:

Unicast: destination ID, source ID

Groupcast: destination group ID, source ID Discovery procedure and related messages for the unicast and groupcast transmission are up to upper layers.

At least the following two SL resource allocation modes are defined as follows.

(1) Mode 1: BS schedules SL resource(s) to be used by UE for SL transmission(s).

(2) Mode 2: UE determines, i.e., BS does not schedule, SL transmission resource(s) within SL resources configured by BS/network or pre-configured SL resources.

The definition of SL resource allocation Mode 2 covers:
a) UE autonomously selects SL resource for transmission
b) UE assists SL resource selection for other UE(s)
c) UE is configured with NR configured grant (Type-1 like) for SL transmission
d) UE schedules SL transmissions of other UEs For SL resource allocation Mode 2, sensing and resource (re-)selection-related procedures may be considered. The sensing procedure considered is defined as decoding sidelink control information (SCI) from other UEs and/or SL measurements. The resource (re-)selection procedure considered uses the results of the sensing procedure to determine resource(s) for SL transmission.

For Mode 2(a), SL sensing and resource selection procedures may be considered in the context of a semi-persistent scheme where resource(s) are selected for multiple transmissions of different TBs and a dynamic scheme where resource(s) are selected for each TB transmission.

The following techniques may be considered to identify occupied SL resources:

Decoding of SL control channel transmissions

SL measurements

Detection of SL transmissions

The following aspects may be considered for SL resource selection:

How a UE selects resource for PSCCH and physical sidelink shared channel (PSSCH) transmission (and other SL physical channel/signals that are defined)

Which information is used by UE for resource selection procedure

Mode 2(b) is a functionality that can be part of Mode 2(a), (c), (d) operation.

For out-of-coverage operation, Mode 2(c) assumes a (pre-)configuration of single or multiple SL transmission patterns, defined on each SL resource pool. For in-coverage operation, Mode 2(c) assumes that gNB configuration indicates single or multiple SL transmission patterns, defined on each SL resource pool. If there is a single pattern configured to a transmitting UE, there is no sensing procedure executed by UE, while if multiple patterns are configured, there is a possibility of a sensing procedure.

A pattern is defined by the size and position(s) of the resource in time and frequency, and the number of resources.

For Mode 2(d), the procedures to become or serve as a scheduling UE for in-coverage and out-of-coverage scenarios may be considered as follows:

Scheduling UE is configured by gNB

Application layer or pre-configuration selects scheduling UE

Receiver UE schedules transmissions of the transmitter UE during the session

Scheduling UE is decided by multiple UEs including the one that is finally selected. The UE may autonomously decide to serve as a scheduling UE/offer scheduling UE functions (i.e., by self-nomination).

Until Rel-15, broadcast transmission is supported only for V2X communication. Broadcast transmission means that V2X transmission by one wireless device is broadcast to several unspecified wireless devices. In case of NR V2X, unicast and groupcast transmission may also be supported for V2X communication as well as broadcast transmission. Unicast transmission means that V2X transmission by one wireless device is transmitted to one specified other wireless device. Groupcast transmission means that V2X transmission by one wireless device is transmitted to several specified other wireless devices which belongs to a group. Unicast transmission is expected to be used for high reliability and low latency cases, e.g., extended sensor sharing and remote driving, emergency, etc.

In NR V2X, one wireless device may establish a PC5 link (e.g., one-to-one connection and/or session between wireless devices) for unicast service with another wireless device. PC5 Signaling protocol above RRC layer in the wireless devices may be used for unicast link establishment and management. Based on the unicast link establishment and management, the wireless devices may exchange PC5 signaling (i.e., upper layer signaling than RRC signaling) to successfully or unsuccessfully establish a unicast link with security activation or release the established unicast link.

Hereinafter, SL-SCH Data transfer is described. It may be referred to as Section 5.14 of 3GPP TS 36.321 v15.7.0.

SL Grant reception and SCI transmission is described.

In order to transmit on the SL-SCH the MAC entity must have at least one sidelink grant.

Sidelink grants are selected as follows for sidelink communication:

if the MAC entity is configured to receive a single sidelink grant dynamically on the PDCCH and more data is available in STCH than can be transmitted in the current SC period, the MAC entity shall:

using the received sidelink grant determine the set of subframes in which transmission of SCI and transmission of first transport block occur;

consider the received sidelink grant to be a configured sidelink grant occurring in those subframes starting at the beginning of the first available SC Period which starts at least 4 subframes after the subframe in which the sidelink grant was received, overwriting a previously configured sidelink grant occurring in the same SC period, if available;

clear the configured sidelink grant at the end of the corresponding SC Period;

else, if the MAC entity is configured by upper layers to receive multiple sidelink grants dynamically on the PDCCH and more data is available in STCH than can be transmitted in the current SC period, the MAC entity shall for each received sidelink grant:

using the received sidelink grant determine the set of subframes in which transmission of SCI and transmission of first transport block occur;

consider the received sidelink grant to be a configured sidelink grant occurring in those subframes starting at the beginning of the first available SC Period which starts at least 4 subframes after the subframe in which the sidelink grant was received, overwriting a previously configured sidelink grant received in the same subframe number but in a different radio frame as this configured sidelink grant occurring in the same SC period, if available;

clear the configured sidelink grant at the end of the corresponding SC Period;

else, if the MAC entity is configured by upper layers to transmit using one or multiple pool(s) of resources and more data is available in STCH than can be transmitted in the current SC period, the MAC entity shall for each sidelink grant to be selected:

if configured by upper layers to use a single pool of resources:

select that pool of resources for use;

else, if configured by upper layers to use multiple pools of resources:

select a pool of resources for use from the pools of resources configured by upper layers whose associated priority list includes the priority of the highest priority of the sidelink logical channel in the MAC PDU to be transmitted;

If more than one pool of resources has an associated priority list which includes the priority of the sidelink logical channel with the highest priority in the MAC PDU to be transmitted, it is left for UE implementation which one of those pools of resources to select.

randomly select the time and frequency resources for SL-SCH and SCI of a sidelink grant from the selected resource pool. The random function shall be such that each of the allowed selections can be chosen with equal probability;

use the selected sidelink grant to determine the set of subframes in which transmission of SCI and transmission of first transport block occur;

consider the selected sidelink grant to be a configured sidelink grant occurring in those subframes starting at the beginning of the first available SC Period which starts at least 4 subframes after the subframe in which the sidelink grant was selected;

clear the configured sidelink grant at the end of the corresponding SC Period;

Retransmissions on SL-SCH cannot occur after the configured sidelink grant has been cleared.

If the MAC entity is configured by upper layers to transmit using one or multiple pool(s) of resources, it is left for UE implementation how many sidelink grants to select within one SC period taking the number of sidelink processes into account.

Sidelink grants are selected as follows for V2X sidelink communication:

if the MAC entity is configured to receive a sidelink grant dynamically on the PDCCH and data is available in STCH, the MAC entity shall for each carrier configured in sl-V2X-ConfigDedicated for which a sidelink grant has been dynamically received on the PDCCH for this TTI:

use the received sidelink grant to determine the number of HARQ retransmissions and the set of subframes in which transmission of SCI and SL-SCH occur;

consider the received sidelink grant to be a configured sidelink grant for the carrier;

if the MAC entity is configured by upper layers to receive a sidelink grant on the PDCCH addressed to SL Semi-Persistent Scheduling V-RNTI, the MAC entity shall for each SL SPS configuration and for each carrier configured in sl-V2X-ConfigDedicated for which a sidelink grant has been received on the PDCCH addressed to SL Semi-Persistent Scheduling V-RNTI for this TTI:

if PDCCH contents indicate SPS activation:

use the received sidelink grant to determine the number of HARQ retransmissions and the set of subframes in which transmission of SCI and SL-SCH occur;

consider the received sidelink grant to be a configured sidelink grant for the carrier.

if PDCCH contents indicate SPS release:

clear the corresponding configured sidelink grant for the carrier.

if the MAC entity is configured by upper layers to transmit using pool(s) of resources in one or multiple carriers based on sensing, or partial sensing, or random selection only if upper layers indicates that transmissions of multiple MAC PDUs are allowed, and the MAC entity selects to create a configured sidelink grant corresponding to transmissions of multiple MAC PDUs, and data is available in STCH associated with one or multiple carriers, the MAC entity shall for each Sidelink process configured for multiple transmissions:

if there is no configured sidelink grant on any carrier allowed for the STCH associated with the Sidelink process as indicated by upper layers:
trigger the TX carrier (re-)selection procedure;
else if there is a configured sidelink grant associated with the Sidelink process:
if SL_RESOURCE_RESELECTION_COUNTER=0 and when SL_RESOURCE_RESELECTION_COUNTER was equal to 1 the MAC entity randomly selected, with equal probability, a value in the interval [0, 1] which is above the probability configured by upper layers in probResourceKeep; or
if neither transmission nor retransmission has been performed by the MAC entity on any resource indicated in the configured sidelink grant during the last second; or
if sl-ReselectAfter is configured and the number of consecutive unused transmission opportunities on resources indicated in the configured sidelink grant is equal to sl-ReselectAfter; or
if none of the configured sidelink grant(s) on the carrier(s) allowed for the STCH have radio resources available in this TTI to accommodate a RLC SDU by using the maximum allowed MCS configured by upper layers in maxMCS-PSSCH and the MAC entity selects not to segment the RLC SDU; or If none of the configured sidelink grant(s) on the carrier(s) allowed for the STCH have radio resources available in this TTI to accommodate the RLC SDU, it is left for UE implementation whether to perform segmentation or sidelink resource reselection.

if none of the configured sidelink grant(s) on the carrier(s) allowed for the STCH have radio resources available in this TTI to fulfil the latency requirement of the data in a sidelink logical channel according to the associated PPPP, and the MAC entity selects not to perform transmission(s) corresponding to a single MAC PDU; or If the latency requirement is not met, it is left for UE implementation whether to perform transmission(s) corresponding to single MAC PDU or sidelink resource reselection.

if the pool of resources where the sidelink grant is configured for the Sidelink process, is reconfigured by upper layers:
clear the configured sidelink grant;
flush the HARQ buffer associated to the Sidelink process;
trigger the TX carrier (re-)selection procedure;
if the TX carrier (re-)selection procedure is triggered in above and the carrier is (re-)selected in the Tx carrier (re-)selection, the following is performed on the selected carrier:
select one of the allowed values configured by upper layers in restrictResourceReservationPeriod and set the resource reservation interval by multiplying 100 with the selected value;

How the UE selects this value is up to UE implementation.

randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;
select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) allowed on the selected carrier and the CBR measured by lower layers if CBR measurement results are available or the corresponding defaultTxConfigIndex configured by upper layers if CBR measurement results are not available;
select an amount of frequency resources within the range that is configured by upper layers between minSubchannel-NumberPSSCH and maxSubchannel-NumberPSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) allowed on the selected carrier and the CBR measured by lower layers if CBR measurement results are available or the corresponding defaultTxConfigIndex configured by upper layers if CBR measurement results are not available;
if transmission based on random selection is configured by upper layers:
randomly select the time and frequency resources for one transmission opportunity from the resource pool, according to the amount of selected frequency resources. The random function shall be such that each of the allowed selections can be chosen with equal probability;
else:
randomly select the time and frequency resources for one transmission opportunity from the resources indicated by the physical layer, according to the amount of selected frequency resources. The random function shall be such that each of the allowed selections can be chosen with equal probability;
use the randomly selected resource to select a set of periodic resources spaced by the resource reservation interval for transmission opportunities of SCI and SL-SCH corresponding to the number of transmission opportunities of MAC PDUs;
if the number of HARQ retransmissions is equal to 1:
if transmission based on random selection is configured by upper layers and there are available resources in the resource pool that meet the conditions for one more transmission opportunity; or
if transmission based on sensing or partial sensing is configured by upper layers and there are available resources left in the resources indicated by the physical layer that meet the conditions for more transmission opportunities:
randomly select the time and frequency resources for one transmission opportunity from the available resources, according to the amount of selected frequency resources. The random function shall be such that each of the allowed selections can be chosen with equal probability;
use the randomly selected resource to select a set of periodic resources spaced by the resource reservation interval for the other transmission opportunities of SCI and SL-SCH corresponding to the number of retransmission opportunities of the MAC PDUs;
consider the first set of transmission opportunities as the new transmission opportunities and the other set of transmission opportunities as the retransmission opportunities;

consider the set of new transmission opportunities and retransmission opportunities as the selected sidelink grant.
else:
consider the set as the selected sidelink grant;
use the selected sidelink grant to determine the set of subframes in which transmissions of SCI and SL-SCH occur;
consider the selected sidelink grant to be a configured sidelink grant;
else if SL_RESOURCE_RESELECTION_COUNTER=0 and when SL_RESOURCE_RESELECTION_COUNTER was equal to 1 the MAC entity randomly selected, with equal probability, a value in the interval [0, 1] which is less than or equal to the probability configured by upper layers in probResourceKeep:
clear the configured sidelink grant, if available;
randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;
use the previously selected sidelink grant for the number of transmissions of the MAC PDUs with the resource reservation interval to determine the set of subframes in which transmissions of SCI and SL-SCH occur;
consider the selected sidelink grant to be a configured sidelink grant;
else, if the MAC entity is configured by upper layers to transmit using pool(s) of resources in one or multiple carriers, the MAC entity selects to create a configured sidelink grant corresponding to transmission(s) of a single MAC PDU, and data is available in STCH associated with one or multiple carriers, the MAC entity shall for a Sidelink process:
trigger the TX carrier (re-)selection procedure;
if the carrier is (re-)selected in the Tx carrier (re-)selection, the following is performed on the selected carrier:
select the number of HARQ retransmissions from the allowed numbers that are configured by upper layers in allowedRetxNumberPSSCH included in pssch-TxConfigList and, if configured by upper layers, overlapped in allowedRetxNumberPSSCH indicated in cbr-pssch-TxConfigList for the highest priority of the sidelink logical channel(s) allowed on the selected carrier and the CBR measured by lower layers if CBR measurement results are available or the corresponding defaultTxConfigIndex configured by upper layers if CBR measurement results are not available;
select an amount of frequency resources within the range that is configured by upper layers between minSubchannel-NumberPSSCH and maxSubchannel-NumberPSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) allowed on the selected carrier and the CBR measured by lower layers if CBR measurement results are available or the corresponding defaultTxConfigIndex configured by upper layers if CBR measurement results are not available;
if transmission based on random selection is configured by upper layers:
randomly select the time and frequency resources for one transmission opportunity of SCI and SL-SCH from the resource pool, according to the amount of selected frequency resources. The random function shall be such that each of the allowed selections can be chosen with equal probability;
else:
randomly select the time and frequency resources for one transmission opportunity of SCI and SL-SCH from the resources indicated by the physical layer, according to the amount of selected frequency resources. The random function shall be such that each of the allowed selections can be chosen with equal probability;
if the number of HARQ retransmissions is equal to 1:
if transmission based on random selection is configured by upper layers and there are available resources in the resource pool that meet the conditions for one more transmission opportunity; or:
if transmission based on sensing or partial sensing is configured by upper layers and there are available resources left in the resources indicated by the physical layer that meet the conditions for one more transmission opportunity:
randomly select the time and frequency resources for the other transmission opportunity of SCI and SL-SCH corresponding to additional transmission of the MAC PDU from the available resources, according to the amount of selected frequency resources. The random function shall be such that each of the allowed selections can be chosen with equal probability;
consider a transmission opportunity which comes first in time as the new transmission opportunity and a transmission opportunity which comes later in time as the retransmission opportunity;
consider both of the transmission opportunities as the selected sidelink grant;
else:
consider the transmission opportunity as the selected sidelink grant;
use the selected sidelink grant to determine the subframes in which transmission(s) of SCI and SL-SCH occur;
consider the selected sidelink grant to be a configured sidelink grant.
For V2X sidelink communication, the UE should ensure the randomly selected time and frequency resources fulfill the latency requirement.
For V2X sidelink communication, when there is no overlapping between the chosen configuration(s) in pssch-TxConfigList and chosen configuration(s) indicated in cbr-pssch-TxConfigList, it is up to UE implementation whether the UE transmits and which transmitting parameters the UE uses between allowed configuration(s) indicated in pssch-TxConfigList and allowed configuration(s) indicated in cbr-pssch-TxConfigList.
The MAC entity shall for each subframe:
for each configured sidelink grant occurring in this subframe:
if SL_RESOURCE_RESELECTION_COUNTER=1 for the Sidelink process associated with the configured sidelink grant and the MAC entity randomly selected, with equal probability, a value in the interval [0, 1] which is above the probability configured by upper layers in probResourceKeep:
set the resource reservation interval for the configured sidelink grant equal to 0;
if the configured sidelink grant corresponds to transmission of SCI:

for V2X sidelink communication in UE autonomous resource selection:
consider the selected transmission format to be SL-V2X-TxProfile for the highest priority of the sidelink logical channel(s) in the MAC PDU;
select a MCS which is, if configured, within the range that is configured by upper layers between minMCS-PSSCH and maxMCS-PSSCH included in pssch-TxConfigList associated with the selected transmission format and, if configured by upper layers, overlapped between minMCS-PSSCH and maxMCS-PSSCH indicated in cbr-pssch-TxConfigList associated with the selected transmission format for the highest priority of the sidelink logical channel(s) in the MAC PDU and the CBR measured by lower layers if CBR measurement results are available or the corresponding default-TxConfigIndex configured by upper layers if CBR measurement results are not available;
MCS selection is up to UE implementation if the MCS or the corresponding range is not configured by upper layers.

For V2X sidelink communication, when there is no overlapping between the chosen configuration(s) included in pssch-TxConfigList and chosen configuration(s) indicated in cbr-pssch-TxConfigList, it is up to UE implementation whether the UE transmits and which transmitting parameters the UE uses between allowed configuration(s) indicated in pssch-TxConfigList and allowed configuration(s) indicated in cbr-pssch-TxConfigList.

for V2X sidelink communication in scheduled resource allocation:
consider the selected transmission format to be SL-V2X-TxProfile for the highest priority of the sidelink logical channel(s) in the MAC PDU;
select a MCS which is associated with the selected transmission format unless it is configured by upper layer;
instruct the physical layer to transmit SCI corresponding to the configured sidelink grant;
for V2X sidelink communication, deliver the configured sidelink grant, the associated HARQ information and the value of the highest priority of the sidelink logical channel(s) in the MAC PDU to the Sidelink HARQ Entity for this subframe;
else if the configured sidelink grant corresponds to transmission of first transport block for sidelink communication:
deliver the configured sidelink grant and the associated HARQ information to the Sidelink HARQ Entity for this subframe.

If the MAC entity has multiple configured sidelink grants occurring in one subframe and if not all of them can be processed due to the single-cluster SC-FDM restriction, it is left for UE implementation which one of these to process according to the procedure above.

Meanwhile, when UE receives activation or deactivation command for a configured grant (CG), UE may trigger the configured grant confirmation and generate the Configured Grant Confirmation MAC Control Element (MAC CE) to transmit to the network. If a CG is activated, UE may transmit data transmission by using the CG.

If multiple configuration grants are activated or deactivated, UE may trigger multiple CG confirmations. In this case, UE may transmit many confirmations to the network, which may cause the network to be confused. There could be mismatch between UE and the network regarding whether a particular CG is activated or deactivated.

Therefore, studies for confirmation of multiple configured grants for sidelink in a wireless communication system are required.

Hereinafter, a method and apparatus for confirmation of multiple configured grants for sidelink in a wireless communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

Figure 12:
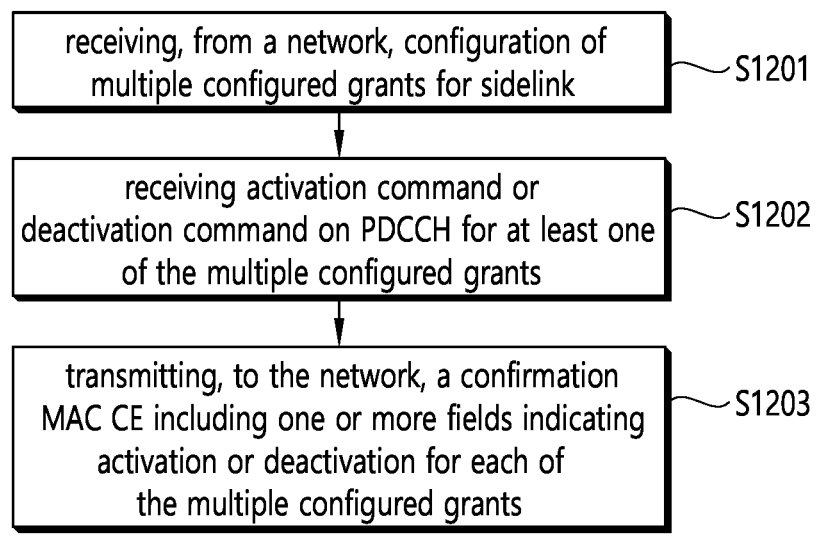
FIG. 12 shows an example of a method for confirmation of multiple configured grants for sidelink in a wireless communication system, according to some embodiments of the present disclosure.

FIG. 12 shows an example of a method for confirmation of multiple configured grants for sidelink in a wireless communication system, according to some embodiments of the present disclosure.

In particular, FIG. 12 shows an example of a method performed by a wireless device.

In step S1201, a wireless device may receive, from a network, configuration of multiple configured grants for sidelink.

In step S1202, a wireless device may receive activation command or deactivation command on Physical Downlink Control Channel (PDCCH) for at least one of the multiple configured grants.

In step S1203, a wireless device may transmit, to the network, a confirmation Media Access Control (MAC) Control Element (CE) including one or more fields indicating activation or deactivation for each of the multiple configured grants.

For example, the confirmation MAC CE may include one or more fields in a bit group of which size is equal to number of the multiple configured grants.

For example, each field in the bit group may be set to (i) zero to indicate deactivation for each of the multiple configured grants or (ii) 1 to indicate activation for each of the multiple configured grants.

For example, each field in the confirmation MAC CE except the bit group may be ignored.

According to some embodiments of the present disclosure, the confirmation MAC CE may include at least one octet. For example, the confirmation MAC CE may consist of one octet. For other example, the confirmation MAC CE may consist of plurality of octets.

According to some embodiments of the present disclosure, all of the one or more fields in the group may be same type. For example one or more fields in a bit group indicating activation or deactivation for each of the multiple configured grants may be a first type.

For example, the confirmation MAC CE may include another type of a field. For example the confirmation MAC CE may include a second type of a field which informs other information rather than activation or deactivation of the configured grants for sidelink. For example, the second type of the field could inform activation or deactivation of at least one of configured grants for uplink.

According to some embodiments of the present disclosure, the confirmation MAC CE may be identified by a MAC subheader with a logical channel identifier (LCID).

According to some embodiments of the present disclosure, the multiple configured grants may include at least one of a configured grant Type 2 with sidelink configured grant index (CG$_i$) configured for a Medium Access Control (MAC) entity of the wireless device.

For example, at least one of the field in the bit group may indicate confirmation to activation or deactivation of the configured grant Type 2 with the sidelink configured grant index (CG$_i$).

According to some embodiments of the present disclosure, a wireless device may generate a MAC PDU including the confirmation MAC CE in logical channel prioritization procedure.

For example, a wireless device may set a priority of the confirmation MAC CE as a highest priority of logical channels associated with the multiple configured grants.

For example, a wireless device may set a priority of the confirmation MAC CE as a highest priority of logical channels belonging to a destination associated with the multiple configured grants.

For example, a wireless device may set a priority of the confirmation MAC CE based on the priority of the each of the multiple configured grants.

According to some embodiments of the present disclosure, a wireless device may prioritize the transmission of the MAC PDU carrying the confirmation MAC CE over the other transmission, if transmission of the MAC PDU carrying the confirmation MAC CE collides with other transmission.

For example, when the value of the priority of the confirmation MAC CE is lower than a threshold or the priority level of the confirmation MAC CE is higher than a threshold, a wireless device may prioritize the transmission of the MAC PDU carrying the confirmation MAC CE over the other transmission.

When the value of the priority of the other transmission is higher than a threshold or the priority level of the other transmission is lower than a threshold, a wireless device may prioritize the transmission of the MAC PDU carrying the confirmation MAC CE over the other transmission.

When the priority of the confirmation MAC CE is higher than the priority of the other transmission, a wireless device may prioritize the transmission of the MAC PDU carrying the confirmation MAC CE over the other transmission.

According to some embodiments of the present disclosure, a wireless device may be in communication with at least one of a user equipment, a network, or an autonomous vehicle other than the wireless device.

Figure 13:
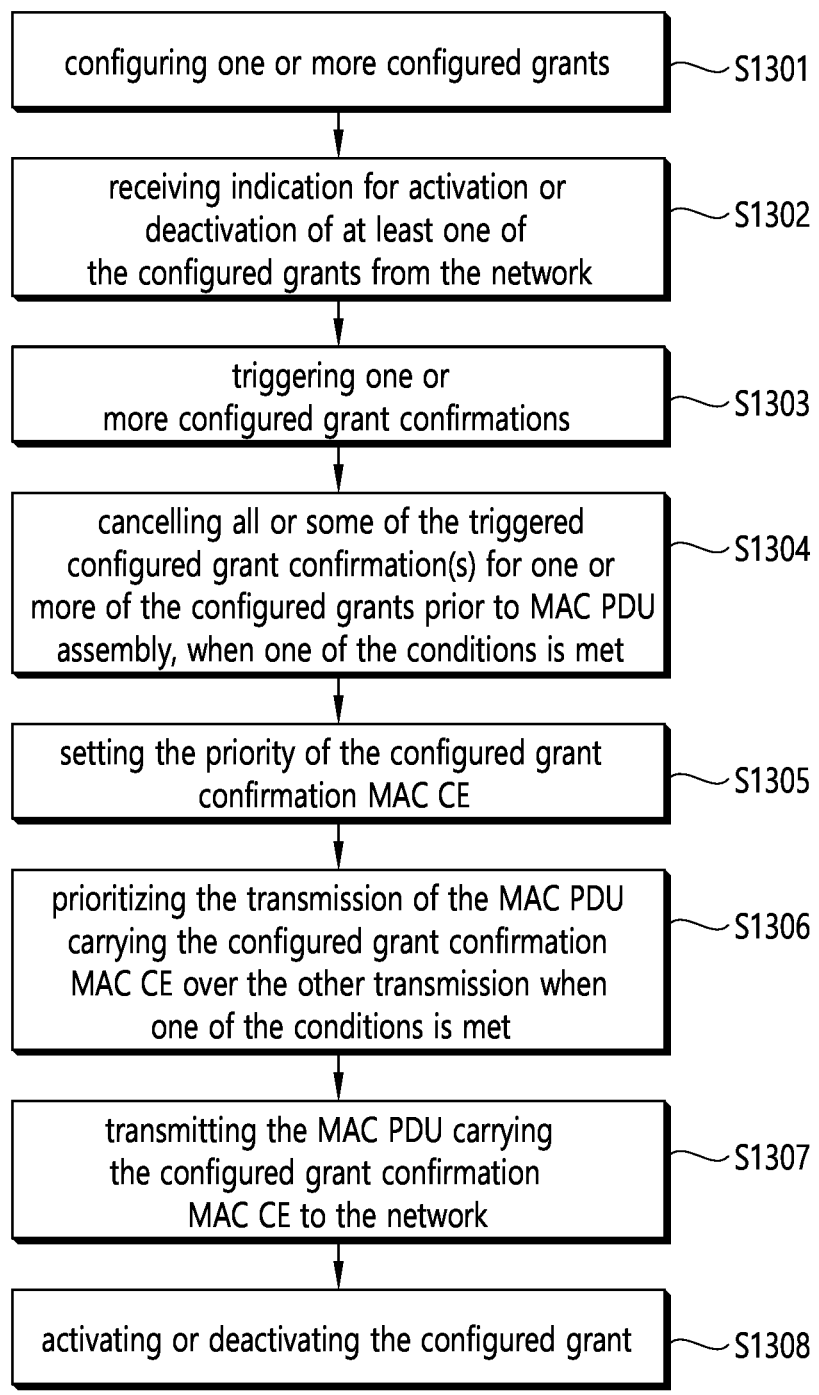
FIG. 13 shows an example of a method for performing data transmission by a UE is a wireless communication system, according to some embodiments of the present disclosure.

FIG. 13 shows an example of a method for performing data transmission by a UE is a wireless communication system, according to some embodiments of the present disclosure.

In step S1301, UE may configure one or more configured grants. For example, UE may be configured with one or more configured grants by the network.

For example, the configured grant may be used for either uplink or sidelink transmission.

In step S1302, UE may receive indication for activation or deactivation of at least one of the configured grants from the network. For example, the network may indicate a command corresponding to activation or deactivation of at least one of the configured grants to the UE.

For example, the command may be transmitted in a Downlink Control Information of the PDCCH addressed to CS-RNTI in a PDCCH occasion where the UE is monitoring.

In step S1303, upon receiving the command, the UE may trigger one or more configured grant confirmations.

For example, each confirmation corresponds to a different configured grant which is activated or deactivated by the command. Alternatively, the confirmation corresponds to all or some of the configured grants, each of which is activated or deactivated by the command In step S1304, when one of the following conditions is met, the UE may cancel all or some of the triggered configured grant confirmation(s) for one or more of the configured grants prior to MAC PDU assembly, when (1) a MAC PDU is transmitted and (2) this PDU includes a Configured Grant Confirmation MAC CE which include confirmation(s) up to (and including) the last event that triggered a configured sidelink grant confirmation prior to the MAC PDU assembly:

When UE determines that the MAC entity autonomously selects resource(s) which may replace the configured sidelink grant(s)

When a reset of the MAC entity controlling the configured grant(s) is requested by upper layers When all logical channels mapped to the configured grant(s) are released When UE performs handover or serving cell change When UE detects beam failure or beam failure occurs In step S1305, if there is at least one triggered configured grant confirmation for activation or deactivation of the configured grant, when UE generates a MAC PDU in logical channel prioritization procedure, UE may set the priority of the configured grant confirmation MAC CE to one of the followings:

The highest priority of the logical channels associated to the configured grant

The highest priority of the logical channels belonging to the destination associated to the configured grant The priority of the configured grant In step S1306, if the MAC PDU carries the configured grant confirmation MAC CE and transmission of the MAC PDU collides with other transmission, UE may prioritize the transmission of the MAC PDU carrying the configured grant confirmation MAC CE over the other transmission when one of the following conditions is met:

When the value of the priority of the configured grant confirmation MAC CE is lower than a threshold or the priority level of the configured grant confirmation MAC CE is higher than a threshold When the value of the priority of the other transmission is higher than a threshold or the priority level of the other transmission is lower than a threshold When the priority of the configured grant confirmation MAC CE is higher than the priority of the other transmission.

In step S1307, if prioritized, the UE may transmit the MAC PDU carrying the configured grant confirmation MAC CE to the network.

In step S1308, if the configured grant is activated by the command, UE may activate the configured grant and perform sidelink transmission or uplink transmission by using the configured grant. If the configured grant is deactivated by the command, UE may deactivate and/or release the configured grant.

Figure 14:
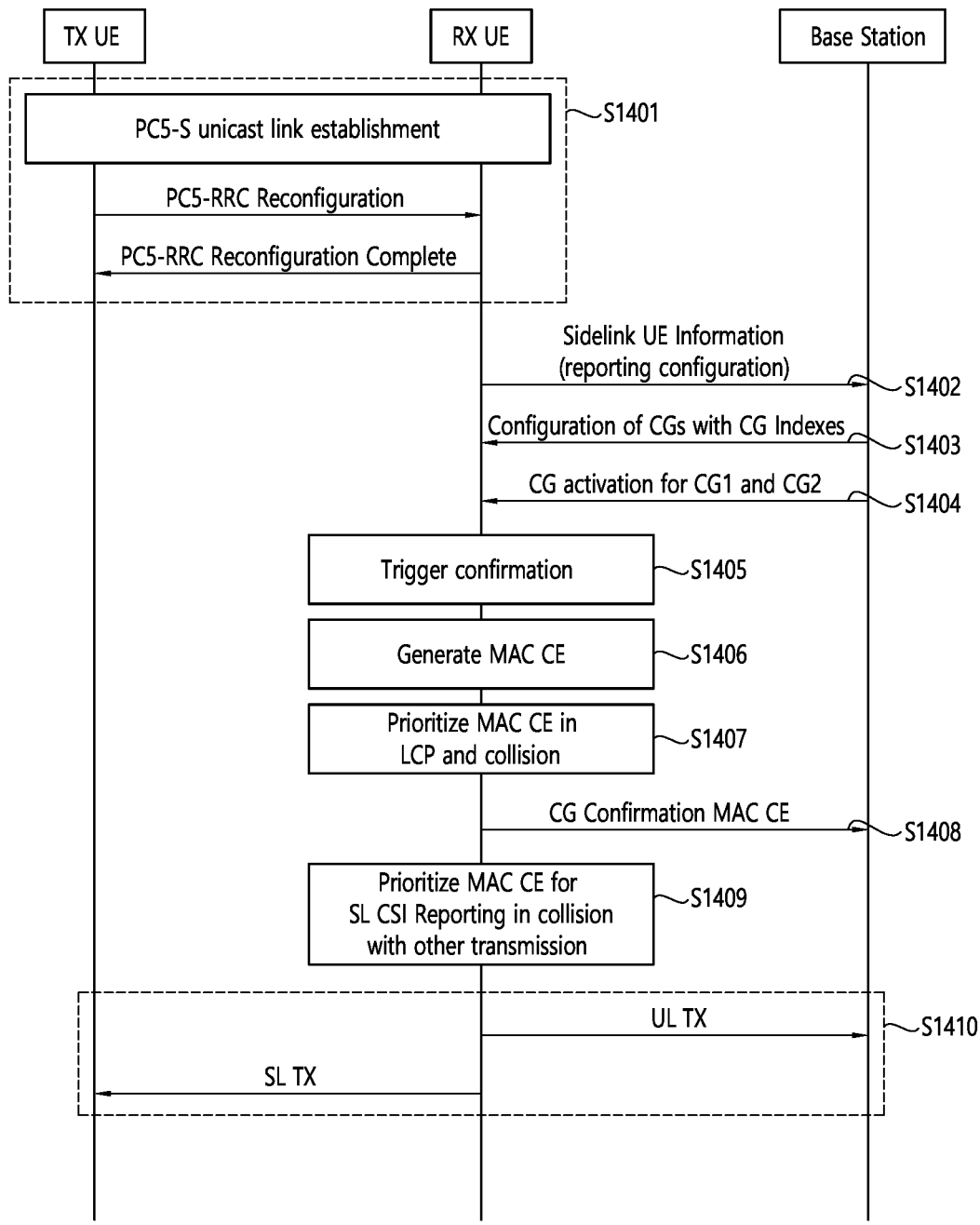
FIG. 14 shows an example of method for configured grant confirmation from a UE in a wireless communication system, according to some embodiments of the present disclosure.

FIG. 14 shows an example of method for configured grant confirmation from a UE in a wireless communication system, according to some embodiments of the present disclosure.

In particular FIG. 14 shows an example of Sidelink (SL)-Buffer Status Report (BSR) and sidelink transmission for SL CSI reporting from a UE according to some embodiments of the present disclosure. However, it is clear that present disclosure is not limited thereto. The present disclosure could be applied to quality reporting for uplink data transmission as well.

In step S1401, RX UE may establish a PC5-S unicast link and the associated PC5-RRC connection with TX UE.

For example, TX UE may transmit a PC5-RRC Reconfiguration to the RX UE. TX UE may receive a PC5-RRC Reconfiguration Complete from the RX UE.

In step S1402, RX UE may send Sidelink UE information indicating the destination ID of the TX UE to the network (for example, a base station (BS)). For example, the sidelink UE information may include reporting configuration.

In step S1403, RX UE may be configured with one or more configured grants by the network. For example, RX UE may receive, from the BS, configuration of CGs with CG indeed.

For example, the configured grant may be used for either uplink or sidelink transmission.

In step S1404, the network may indicate a command corresponding to activation or deactivation of at least one of the configured grants to the UE. For example, RX UE may receive, from the BS, CG activation command for CG1 and CG2.

For example, the command may be transmitted in a Downlink Control Information of the PDCCH addressed to CS-RNTI in a PDCCH occasion where the UE is monitoring.

In step S1405, upon receiving the command, the UE may trigger one or more configured grant confirmations.

For example, each confirmation may correspond to a different configured grant which is activated or deactivated by the command. Alternatively, the confirmation corresponds to all or some of the configured grants, each of which is activated or deactivated by the command In step S1406, a RX UE may generate a MAC CE for confirmation of the activation or the deactivation command for configured grants.

According to some embodiments of the present disclosure, when one of the following conditions is met, the UE may cancel all or some of the triggered configured grant confirmation(s) for one or more of the configured grants prior to MAC PDU assembly, when (1) a MAC PDU is transmitted and (2) this PDU includes a Configured Grant Confirmation MAC CE which include confirmation(s) up to (and including) the last event that triggered a configured sidelink grant confirmation prior to the MAC PDU assembly:

When UE determines that the MAC entity autonomously selects resource(s) which may replace the configured sidelink grant(s)

When a reset of the MAC entity controlling the configured grant(s) is requested by upper layers When all logical channels mapped to the configured grant(s) are released When UE performs handover or serving cell change When UE detects beam failure or beam failure occurs In step S1407, a RX UE may prioritize the generated MAC CE based on (1) logical channel prioritization (LCP) procedure, and/or (2) collision with other transmission.

According to some embodiment of the present disclosure, if there is at least one triggered configured grant confirmation for activation or deactivation of the configured grant, when UE generates a MAC PDU in logical channel prioritization procedure, UE may set the priority of the configured grant confirmation MAC CE to one of the followings:

The highest priority of the logical channels associated to the configured grant

The highest priority of the logical channels belonging to the destination associated to the configured grant The priority of the configured grant According to some embodiment of the present disclosure, if the MAC PDU carries the configured grant confirmation MAC CE and transmission of the MAC PDU collides with other transmission, UE may prioritize the transmission of the MAC PDU carrying the configured grant confirmation MAC CE over the other transmission when one of the following conditions is met:

When the value of the priority of the configured grant confirmation MAC CE is lower than a threshold or the priority level of the configured grant confirmation MAC CE is higher than a threshold When the value of the priority of the other transmission is higher than a threshold or the priority level of the other transmission is lower than a threshold When the priority of the configured grant confirmation MAC CE is higher than the priority of the other transmission.

In step S1408, if prioritized, the RX UE may transmit the MAC PDU carrying the configured grant confirmation MAC CE to the network.

In step S1409, the RX UE may prioritize the MAC CE for SL CSI reporting in collision with other transmission.

In step S1410, if the configured grant is activated by the command, UE may activate the configured grant and perform sidelink transmission or uplink transmission by using the configured grant. If the configured grant is deactivated by the command, UE may deactivate and/or release the configured grant.

For example, the UL transmissions and SL transmissions can be performed for different RATs or the same RAT.

Hereinafter, a method for confirmation of multiple configured grants for sidelink in a wireless communication system, according to some embodiments of the present disclosure will be described. The method may be performed by a wireless device, for example, a UE.

According to some embodiments of the present disclosure, a UE may perform operations related to Scheduled Resource Allocation.

NG-RAN can dynamically allocate resources to the UE via the SL-RNTI on PDCCH(s) for NR sidelink communication.

In addition, NG-RAN can allocate sidelink resources to a UE with two types of configured sidelink grants:

With type 1, RRC directly provides the configured sidelink grant only for NR sidelink communication;

With type 2, RRC defines the periodicity of the configured sidelink grant while PDCCH can either signal and activate the configured sidelink grant, or deactivate it. The PDCCH is addressed to SL-CS-RNTI for NR sidelink communication.

Besides, NG-RAN can also semi-persistently allocate sidelink resources to the UE via the V-RNTI on PDCCH(s) for V2X sidelink communication.

For the UE performing NR sidelink communication, there can be more than one configured sidelink grant activated at a time on the carrier configured for sidelink transmission.

When beam failure or physical layer problem occurs on MCG, the UE can continue using the configured sidelink grant Type 1 until initiation of the RRC connection re-establishment procedure. During handover, the UE can be provided with configured sidelink grants via handover command, regardless of the type. If provided, the UE activates the configured sidelink grant Type 1 upon reception of the handover command or execution of CHO.

The UE can send sidelink buffer status report to support scheduler operation in NG-RAN. The sidelink buffer status reports refer to the data that is buffered in for a group of logical channels (LCG) per destination in the UE. Eight LCGs are used for reporting of the sidelink buffer status reports. Two formats, which are SL BSR and truncated SL BSR, are used.

According to some embodiments of the present disclosure, a UE may perform operations related to sidelink.

There are two types of transmission without dynamic grant:
configured grant Type 1 where an sidelink grant is provided by RRC, and stored as configured sidelink grant;
configured grant Type 2 where an sidelink grant is provided by PDCCH, and stored or cleared as configured sidelink grant based on L1 signalling indicating configured sidelink grant activation or deactivation.

Type 1 and/or Type 2 are configured with a single BWP. Multiple configurations of up to 8 configured grants (including both Type 1 and Type 2, if configured) can be active simultaneously on the BWP.

RRC configures the following parameters when the configured grant Type 1 is configured:
sl-ConfigIndexCG: the identifier of a configured grant for sidelink;
sl-CS-RNTI: SLCS-RNTI for retransmission;
sl-NrOfHARQ-Processes: the number of HARQ processes for configured grant;
sl-PeriodCG: periodicity of the configured grant Type 1;
sl-TimeOffsetCG-Type1: Offset of a resource with respect to SFN=sl-TimeReferenceSFN-Type1 in time domain, referring to the number of logical slots that can be used for SL transmission;
sl-TimeResourceCG-Type1: time resource location of the configured grant Type 1;
sl-CG-MaxTransNumList: the maximum number of times that a TB can be transmitted using the configured grant;
sl-HARQ-ProcID-offset: offset of HARQ process for configured grant Type 1;
sl-TimeReferenceSFN-Type1: SFN used for determination of the offset of a resource in time domain. The UE uses the closest SFN with the indicated number preceding the reception of the sidelink configured grant configuration Type 1.

RRC configures the following parameters when the configured grant Type 2 is configured:
sl-ConfigIndexCG: the identifier of a configured grant for sidelink;
sl-CS-RNTI: SLCS-RNTI for activation, deactivation, and retransmission;
sl-NrOfHARQ-Processes: the number of HARQ processes for configured grant;
sl-PeriodCG: periodicity of the configured grant Type 2;
sl-CG-MaxTransNumList: the maximum number of times that a TB can be transmitted using the configured grant;
sl-HARQ-ProcID-offset: offset of HARQ process for configured grant Type 2.

Upon configuration of a configured grant Type 1, the MAC entity shall for each configured sidelink grant:
1> store the sidelink grant provided by RRC as a configured sidelink grant;
1> initialise or re-initialise the configured sidelink grant to determine PSCCH duration(s) and PSSCH duration(s) according to sl-TimeOffsetCG-Type1 and sl-TimeResourceCG-Type1, and to reoccur with sl-periodCG for transmissions of multiple MAC PDUs.

If the MAC entity is configured with multiple configured sidelink grants, collision among the configured sidelink grants may occur. How to handle the collision is left to UE implementation.

After a sidelink grant is configured for a configured grant Type 1, the MAC entity shall consider sequentially that the first slot of the $S^{th}$ sidelink grant occurs in the logical slot for which:

[(SFN×numberOfSLSlotsPerFrame)+logical slot number in the frame]=(sl-TimeReferenceSFN-Type1×numberOfSLSlotsPerFrame+sl-TimeOffsetCGType1+S×PeriodicitySL)modulo(1024×numberOfSLSlotsPerFrame).

where $$PeriodicitySL = \left\lceil \frac{N}{20 \text{ ms}} \times \text{sl\_periodCG} \right\rceil,$$

numberOfSLSlotsPerFrame refers to the number of logical slots that can be used for SL transmission in the frame and N refer to the number of slots that can be used for SL transmission within 20 ms, if configured, of TDD-UL-DL-ConfigCommon.

After a sidelink grant is configured for a configured grant Type 2, the MAC entity shall consider sequentially that the first slot of $S^{th}$ sidelink grant occurs in the logical slot for which:

[(SFN x numberOfSLSlotsPerFrame)+logical slot number in the frame]=[(SFN$_{start\ time}$×numberOfSLSlotsPerFrame+slot$_{start\ time}$)+S×PeriodicitySL]modulo(1024×numberOfSLSlotsPerFrame).

where SFN$_{start\ time}$ and slot$_{start\ time}$ are the SFN and logical slot, respectively, of the first transmission opportunity of PSSCH where the configured sidelink grant was (re-)initialised.

When a configured sidelink grant is released by RRC, all the corresponding configurations shall be released and all corresponding sidelink grants shall be cleared.

The MAC entity shall:
1> if the configured sidelink grant confirmation has been triggered and not cancelled; and
1> if the MAC entity has UL resources allocated for new transmission:
2> instruct the Multiplexing and Assembly procedure to generate a Sidelink Configured Grant Confirmation MAC CE as defined in clause 6.1.3.34;
2> cancel the triggered configured sidelink grant confirmation.

For a configured grant Type 2, the MAC entity shall clear the corresponding configured sidelink grant immediately after first transmission of Sidelink Configured Grant Confirmation MAC CE triggered by the configured sidelink grant deactivation.

According to some embodiments of the present disclosure, a UE may perform operations related to SL Grant reception and SCI transmission Sidelink grant is received dynamically on the PDCCH, configured semi-persistently by RRC or autonomously selected by the MAC entity. The MAC entity shall have a sidelink grant on an active SL BWP to determine a set of PSCCH duration(s) in which transmission of SCI occurs and a set of PSSCH duration(s) in which transmission of SL-SCH associated with the SCI occurs. A sidelink grant addressed to SLCS-RNTI with NDI=1 is considered as a dynamic sidelink grant.

If the MAC entity has been configured with Sidelink resource allocation mode 1, the MAC entity shall for each PDCCH occasion and for each grant received for this PDCCH occasion:

1> if a sidelink grant has been received on the PDCCH for the MAC entity's SL-RNTI:

2> if the NDI received on the PDCCH has been not toggled compared to the value in the previously received HARQ information for the HARQ Process ID:

3> use the received sidelink grant to determine PSCCH duration(s) and PSSCH duration(s) for one or more retransmissions of a single MAC PDU for the corresponding Sidelink process.

2> else:

3> use the received sidelink grant to determine PSCCH duration(s) and PSSCH duration(s) for initial transmission and, if available, retransmission(s) of a single MAC PDU.

2> if a sidelink grant is available for retransmission(s) of a MAC PDU which has been positively acknowledged:

3> clear the PSCCH duration(s) and PSSCH duration(s) corresponding to retransmission(s) of the MAC PDU from the sidelink grant.

1> else if a sidelink grant has been received on the PDCCH for the MAC entity's SLCS-RNTI:

2> if PDCCH contents indicate retransmission(s) for the identified HARQ process ID that has been set for an activated configured sidelink grant identified by sl-ConfigIndexCG:

3> use the received sidelink grant to determine PSCCH duration(s) and PSSCH duration(s) for one or more retransmissions of a single MAC PDU.

2> else if PDCCH contents indicate configured grant Type 2 deactivation for a configured sidelink grant:

3> clear the configured sidelink grant, if available;

3> trigger configured sidelink grant confirmation for the configured sidelink grant.

2> else if PDCCH contents indicate configured grant Type 2 activation for a configured sidelink grant:

3> trigger configured sidelink grant confirmation for the configured sidelink grant;

3> store the configured sidelink grant;

3> initialise or re-initialise the configured sidelink grant to determine the set of PSCCH durations and the set of PSSCH durations for transmissions of multiple MAC PDUs.

The MAC entity shall for each PSSCH duration:

1> for each sidelink grant occurring in this PSSCH duration:

2> if the MAC entity has been configured with Sidelink resource allocation mode 1:

3> select a MCS which is, if configured, within the range that is configured by RRC between sl-MinMCS-PSSCH and sl-MaxMCS-PSSCH included in sl-ConfigDedicatedNR;

3> set the resource reservation interval to 0 ms.

2> else:

3> select a MCS which is, if configured, within the range that is configured by RRC between sl-MinMCS-PSSCH and sl-MaxMCS-PSSCH included in sl-PSSCH-TxConfigList and, if configured by RRC, overlapped between sl-MinMCS-PSSCH and sl-MaxMCS-PSSCH indicated in sl-CBR-PSSCH-TxConfigList for the highest priority of the sidelink logical channel(s) in the MAC PDU and the CBR measured by lower layers if CBR measurement results are available or the corresponding sl-defaultTxConfigIndex configured by RRC if CBR measurement results are not available;

3> if the MAC entity decides not to use the selected sidelink grant for the next PSSCH duration:

4> set the resource reservation interval to 0 ms.

3> else:

4> set the resource reservation interval to the selected value.

MCS selection is up to UE implementation if the MCS or the corresponding range is not configured by RRC.

2> if the configured sidelink grant has been activated and this PSSCH duration corresponds to the first PSSCH transmission opportunity within this sl-PeriodCG of the configured sidelink grant:

3> set the HARQ Process ID to the HARQ Process ID associated with this PSSCH duration and, if available, all subsequent PSSCH duration(s) occurring in this sl-PeriodCG for the configured sidelink grant;

3> determine that this PSSCH duration is used for initial transmission;

3> if a dynamic sidelink grant associated to the HARQ Process ID has been received on the PDCCH for the MAC entity's SLCS-RNTI:

4> clear the dynamic sidelink grant.

2> deliver the sidelink grant, the selected MCS, and the associated HARQ information to the Sidelink HARQ Entity for this PSSCH duration.

For configured sidelink grants, the HARQ Process ID associated with the first slot of a SL transmission is derived from the following equation:

HARQ Process ID=[floor(CURRENT_slot/sl-PeriodCG)]modulo sl-NrOfHARQ-Processes+sl-HARQ-ProcID-offset where CURRENT_slot=(SFN× numberOfSlotsPerFrame+slot number in the frame), and numberOfSlotsPerFrame refer to the number of consecutive slots per frame.

According to some embodiments of the present disclosure, a UE may perform operations related to allocation of resources.

The MAC entity shall, when a new transmission is performed:

1> allocate resources to the logical channels as follows:

2> logical channels for the UL grant with Bj>0 are allocated resources in a decreasing priority order. If the PBR of a logical channel is set to infinity, the MAC entity shall allocate resources for all the data that is available for transmission on the logical channel before meeting the PBR of the lower priority logical channel(s);

2> decrement Bj by the total size of MAC SDUs served to logical channel j above;

2> if any resources remain, all the logical channels are served in a strict decreasing priority order (regardless of the value of Bj) until either the data for that logical channel or the UL grant is exhausted, whichever comes first. Logical channels configured with equal priority should be served equally.

The value of Bj can be negative.

If the MAC entity is requested to simultaneously transmit multiple MAC PDUs, or if the MAC entity receives the multiple UL grants within one or more coinciding PDCCH occasions (i.e. on different Serving Cells), it is up to UE implementation in which order the grants are processed.

The UE shall also follow the rules below during the scheduling procedures above:

the UE should not segment an RLC SDU (or partially transmitted SDU or retransmitted RLC PDU) if the whole SDU (or partially transmitted SDU or retransmitted RLC PDU) fits into the remaining resources of the associated MAC entity;

if the UE segments an RLC SDU from the logical channel, it shall maximize the size of the segment to fill the grant of the associated MAC entity as much as possible;

the UE should maximise the transmission of data;
 if the MAC entity is given a UL grant size that is equal to or larger than 8 bytes while having data available and allowed for transmission, the MAC entity shall not transmit only padding BSR and/or padding.

The MAC entity shall not generate a MAC PDU for the HARQ entity if the following conditions are satisfied:
 the MAC entity is configured with skip UplinkTxDynamic with value true and the grant indicated to the HARQ entity was addressed to a C-RNTI, or the grant indicated to the HARQ entity is a configured uplink grant; and
 there is no aperiodic CSI requested for this PUSCH transmission; and
 the MAC PDU includes zero MAC SDUs; and
 the MAC PDU includes only the periodic BSR and there is no data available for any LCG, or the MAC PDU includes only the padding BSR.

Logical channels shall be prioritised in accordance with the following order (highest priority listed first):
 C-RNTI MAC CE or data from UL-CCCH;
 Sidelink Configured Grant Confirmation MAC CE;
 Configured Grant Confirmation MAC CE;
 Sidelink Configured Grant Confirmation MAC CE, with exception of the Sidelink Configured Grant Confirmation MAC CE;
 MAC control element for SL-BSR prioritized;
 MAC CE for BSR, with exception of BSR included for padding;
 Single Entry PHR MAC CE or Multiple Entry PHR MAC CE;
 MAC control element for SL-BSR, with exception of SL-BSR and SL-BSR included for padding;
 data from any Logical Channel, except data from UL-CCCH;
 MAC CE for Recommended bit rate query;
 MAC CE for BSR included for padding;
 MAC CE for SL-BSR included for padding.

According to some embodiments of the present disclosure, a UE may perform operations related to sidelink.

There are two types of transmission without dynamic grant:
 configured grant Type 1 where an sidelink grant is provided by RRC, and stored as configured sidelink grant;
 configured grant Type 2 where an sidelink grant is provided by PDCCH, and stored or cleared as configured sidelink grant based on L1 signalling indicating configured sidelink grant activation or deactivation.

Type 1 or Type 2 are configured with a single BWP. Multiple configurations can be active simultaneously on the BWP.

RRC configures the following parameters when the configured grant Type 1 is configured:
 periodicity: periodicity of the configured grant Type 1;
 timeDomainOffset: Offset of a resource with respect to [SFN=0] in time domain;

RRC configures the following parameters when the configured grant Type 2 is configured:
 [slcs-RNTI: SLCS-RNTI] for activation and deactivation;
 periodicity: periodicity of the configured grant Type 2;

Upon configuration of a configured grant Type 1, the MAC entity shall for each configured sidelink grant:

1> initialise or re-initialise the configured sidelink grant to determine the set of PSCCH durations and the set of PSSCH durations for transmissions of multiple MAC PDUs.

When a configured sidelink grant is released by upper layers, all the corresponding configurations shall be released and all corresponding sidelink grants shall be cleared.

The MAC entity shall:
 1> if the configured sidelink grant confirmation has been triggered and not cancelled; and
 1> if the MAC entity has UL resources allocated for new transmission:
  2> instruct the Multiplexing and Assembly procedure to generate a Sidelink Configured Grant Confirmation MAC CE;
  2> if [thresSL-TxPrioritization] is configured and either the value of the highest priority of the logical channels that belong to any LCG and contain SL data for any Destination is lower than [thresSL-TxPrioritization] or the value of the highest priority of the logical channels that belong to any Destination for which a CSI MAC CE has been triggered and not cancelled is lower than [thresSL-TxPrioritization]; and
  2> if either [thresUL-TxPrioritization] is not configured or [thresUL-TxPrioritization] is configured and the value of the highest priority of the logical channels that belong to any LCG and contain UL data is equal to or higher than [thresUL-TxPrioritization]:
   3> prioritize the Sidelink Configured Grant Confirmation MAC CE in Logical Channel Prioritization:

Each bit of the Sidelink Configured Grant Confirmation MAC CE are set according to the latest status of each configured grant, i.e. activation or deactivation, for all configured grants configured by RRC.

2> cancel all configured sidelink grant confirmations prior to MAC PDU assembly when a MAC PDU is transmitted and this PDU includes a Configured Grant Confirmation MAC CE which include confirmation(s) up to (and including) the last event that triggered a configured sidelink grant confirmation prior to the MAC PDU assembly.

1> when upper layers configure autonomous resource selection or autonomous resource selection replacing the configured sidelink grant is configured; or
 1> if a reset of the MAC entity is requested by upper layers; or
 1> if all logical channels (or a destination or a PC5-RRC connection) mapped to the configured sidelink grant are released:
  2> cancel all configured sidelink grant confirmations immediately after first transmission of the generated Sidelink Configured Grant Confirmation.

For a configured grant Type 2, the MAC entity shall clear the corresponding configured sidelink grant immediately after first transmission of Sidelink Configured Grant Confirmation MAC CE indicating a confirmation of the configured sidelink grant deactivation.

Figure 15:
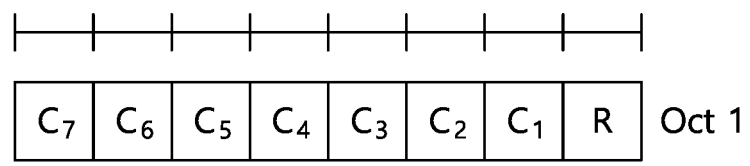
FIG. 15 shows an example of Sidelink Configured Grant Confirmation MAC CE according to some embodiments of the present disclosure.

FIG. 15 shows an example of Sidelink Configured Grant Confirmation MAC CE according to some embodiments of the present disclosure.

In particular, FIG. 15 an example of Sidelink Configured Grant Confirmation MAC CE when 7 sidelink configured grants are configured at the same time.

For example, the Sidelink Configured Grant Confirmation MAC CE may be identified by a MAC subheader with LCID as Table 5 as below. Table 5 may include values of LCID for UL-SCH.

TABLE 5

| Index | LCID values |
| --- | --- |
| 0 | CCCH of size 64 bits |
| 1-32 | Identity of the logical channel |
| 33-48 | Reserved |
| 49 | Sidelink Configured Grant Confirmation |
| 50 | Truncated Sidelink BSR |
| 51 | Sidelink BSR |
| 52 | CCCH of size 48 bits |
| 53 | Recommended bit rate query |
| 54 | Multiple Entry PHR (four octets Ci) |
| 55 | Configured Grant Confirmation |
| 56 | Multiple Entry PHR (one octet Ci) |
| 57 | Single Entry PHR |
| 58 | C-RNTI |
| 59 | Short Truncated BSR |
| 60 | Long Truncated BSR |
| 61 | Short BSR |
| 62 | Long BSR |
| 63 | Padding |

Regarding to FIG. 15, the Sidelink Configured Grant Confirmation MAC CE may include $C_i$ fields and an R field as below.

$C_i$: If a Sidelink Configured Grant Type 2 is configured for the MAC entity with CGIndex i as, this field may indicate confirmation of the activation/deactivation status of the Sidelink Configured Grant with CGIndex i, else the network shall ignore the $C_i$ field. The $C_i$ field may be set to 1 to indicate that the activation of the Sidelink Configured Grant with CGIndex i is confirmed by the MAC entity. The $C_i$ field may be set to 0 to indicate that the deactivation of the Sidelink Configured Grant with CGIndex i is confirmed by the MAC entity.

R: Reserved bit, set to 0.

Each bit of the MAC CE may correspond to activation or deactivation of a Sidelink Configuration Grant. Mapping between the bit of the MAC CE and the Sidelink Configuration Grant is configured via RRC by the network.

FIG. 15 may illustrate an example of the format of the Sidelink Configured Grant Confirmation MAC CE when 7 sidelink configured grants are configured at the same time. Each C field corresponds to a different Sidelink Configured Grant Type 2 configured by RRC. When 8 sidelink configured grants are configured by the network, R field may be changed to an additional C field.

Alternatively, the Sidelink Configured Grant Confirmation MAC CE may be identified by a MAC subheader with one or more LCIDs. If one or more Sidelink Configuration Grants are configured by RRC, different LCID values may be allocated to different Sidelink Configured Grants. If the MAC CE is triggered for the confirmation of a Sidelink Configured Grant, a LCID field indicating the LCID value corresponding to the Sidelink Configuration Grant MAC CE may be included in a MAC PDU to be transmitted in uplink. If more than one confirmation for different Sidelink Configured Grants are triggered, different LCID fields, each of which corresponds to a different Sidelink Configuration Grant MAC CE, may be included in a MAC PDU to be transmitted in uplink. The size of the payload corresponding to the MAC CE may be zero bits in the MAC PDU.

Figure 16:
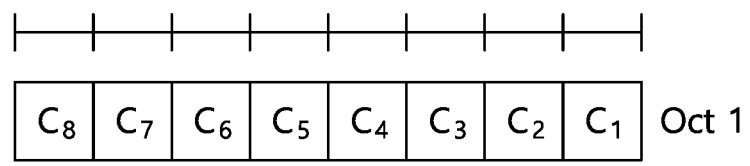
FIG. 16 shows an example of Sidelink Configured Grant Confirmation MAC CE according to some embodiments of the present disclosure.

FIG. 16 shows an example of Sidelink Configured Grant Confirmation MAC CE according to some embodiments of the present disclosure.

The Sidelink Configured Grant Confirmation MAC CE may be identified by a MAC subheader with eLCID as specified in Table 6 below. Table 6 may include values of one-octet eLCID for UL-SCH.

TABLE 6

| Codepoint | Index | LCID values |
| --- | --- | --- |
| 0 to 249 | 64 to 313 | Reserved |
| 250 | 314 | BFR (four octets Ci) |
| 251 | 315 | Truncated BFR (four octets Ci) |
| 252 | 316 | Multiple Entry Configured Grant Confirmation |
| 253 | 317 | Sidelink Configured Grant Confirmation |
| 254 | 318 | Desired Guard Symbols |
| 255 | 319 | Pre-emptive BSR |

Regarding to FIG. 16, the Sidelink Configured Grant Confirmation MAC CE may be defined as follows:

$C_i$: If there is a configured grant Type 2 with sl-ConfigIndexCG i configured for the MAC entity, this field may indicate the confirmation to activation/deactivation of the configured grant with sl-ConfigIndexCG i, else the MAC entity shall ignore the $C_i$ field. The $C_i$ field may be set to 1 to confirm that the configured grant with sl-ConfigIndexCG i shall be activated. The $C_i$ field may be set to 0 to indicate that the configured grant with sl-ConfigIndexCG i shall be deactivated.

Hereinafter, an apparatus for confirmation of multiple configured grants for sidelink in a wireless communication system, according to some embodiments of the present disclosure, will be described. Herein, the apparatus may be a wireless device (100 or 200) in FIGS. 2, 3, and 5.

For example, a wireless device may perform methods described above. The detailed description overlapping with the above-described contents could be simplified or omitted.

Referring to FIG. 5, a wireless device 100 may include a processor 102, a memory 104, and a transceiver 106.

According to some embodiments of the present disclosure, the processor 102 may be configured to be coupled operably with the memory 104 and the transceiver 106.

The processor 102 may be configured to control the transceiver 106 to receive, from a network, configuration of multiple configured grants for sidelink. The processor 102 may be configured to control the transceiver 106 to receive activation command or deactivation command on Physical Downlink Control Channel (PDCCH) for at least one of the multiple configured grants. The processor 102 may be configured to control the transceiver 106 to transmit, to the network, a confirmation Media Access Control (MAC) Control Element (CE). The confirmation MAC CE may include one or more fields in a bit group of which size is equal to number of the multiple configured grants. Each field in the bit group may be set to (i) zero to indicate deactivation for each of the multiple configured grants or (ii) 1 to indicate activation for each of the multiple configured grants. Each field in the confirmation MAC CE except the bit group is ignored.

According to some embodiments of the present disclosure, the confirmation MAC CE may include at least one octet.

According to some embodiments of the present disclosure, all of the one or more fields in the group may be same type.

According to some embodiments of the present disclosure, the confirmation MAC CE may include another type of a field.

According to some embodiments of the present disclosure, the confirmation MAC CE may be identified by a MAC subheader with a logical channel identifier (LCID).

According to some embodiments of the present disclosure, the multiple configured grants includes at least one of a configured grant Type 2 with sidelink configured grant index ($CG_i$) configured for a Medium Access Control (MAC) entity of the wireless device.

For example, at least one of the field in the bit group may indicate confirmation to activation or deactivation of the configured grant Type 2 with the sidelink configured grant index ($CG_i$).

According to some embodiments of the present disclosure, the confirmation MAC CE may consist of one octet.

According to some embodiments of the present disclosure, the processor 102 may be configured to set a priority of the confirmation MAC CE as a highest priority of logical channels associated with the multiple configured grants.

According to some embodiments of the present disclosure, the processor 102 may be configured to set a priority of the confirmation MAC CE as a highest priority of logical channels belonging to a destination associated with the multiple configured grants.

According to some embodiments of the present disclosure, the processor 102 may be configured to be in communication with at least one of a user equipment, a network, or an autonomous vehicle other than the wireless device.

Hereinafter, a processor for a wireless device for confirmation of multiple configured grants for sidelink in a wireless communication system, according to some embodiments of the present disclosure, will be described.

The processor may be configured to control the wireless device to receive, from a network, configuration of multiple configured grants for sidelink. The processor may be configured to control the wireless device to receive activation command or deactivation command on Physical Downlink Control Channel (PDCCH) for at least one of the multiple configured grants. The processor may be configured to control the wireless device to transmit, to the network, a confirmation Media Access Control (MAC) Control Element (CE). The confirmation MAC CE may include one or more fields in a bit group of which size is equal to number of the multiple configured grants. Each field in the bit group may be set to (i) zero to indicate deactivation for each of the multiple configured grants or (ii) 1 to indicate activation for each of the multiple configured grants. Each field in the confirmation MAC CE except the bit group is ignored.

According to some embodiments of the present disclosure, the confirmation MAC CE may include at least one octet.

According to some embodiments of the present disclosure, all of the one or more fields in the group may be same type.

According to some embodiments of the present disclosure, the confirmation MAC CE may include another type of a field.

According to some embodiments of the present disclosure, the confirmation MAC CE may be identified by a MAC subheader with a logical channel identifier (LCID).

According to some embodiments of the present disclosure, the multiple configured grants includes at least one of a configured grant Type 2 with sidelink configured grant index ($CG_i$) configured for a Medium Access Control (MAC) entity of the wireless device.

For example, at least one of the field in the bit group may indicate confirmation to activation or deactivation of the configured grant Type 2 with the sidelink configured grant index ($CG_i$).

According to some embodiments of the present disclosure, the confirmation MAC CE may consist of one octet.

According to some embodiments of the present disclosure, the processor may be configured to control the wireless device to set a priority of the confirmation MAC CE as a highest priority of logical channels associated with the multiple configured grants.

According to some embodiments of the present disclosure, the processor may be configured to control the wireless device to set a priority of the confirmation MAC CE as a highest priority of logical channels belonging to a destination associated with the multiple configured grants.

According to some embodiments of the present disclosure, the processor may be configured to control the wireless device to be in communication with at least one of a user equipment, a network, or an autonomous vehicle other than the wireless device.

Hereinafter, a non-transitory computer-readable medium has stored thereon a plurality of instructions for confirmation of multiple configured grants for sidelink in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device.

The stored a plurality of instructions may cause the wireless device to receive, from a network, configuration of multiple configured grants for sidelink. The stored a plurality of instructions may cause the wireless device to receive activation command or deactivation command on Physical Downlink Control Channel (PDCCH) for at least one of the multiple configured grants. The stored a plurality of instructions may cause the wireless device to transmit, to the network, a confirmation Media Access Control (MAC) Control Element (CE). The confirmation MAC CE may include one or more fields in a bit group of which size is equal to number of the multiple configured grants. Each field in the bit group may be set to (i) zero to indicate deactivation for each of the multiple configured grants or (ii) 1 to indicate activation for each of the multiple configured grants. Each field in the confirmation MAC CE except the bit group is ignored.

According to some embodiments of the present disclosure, the confirmation MAC CE may include at least one octet.

According to some embodiments of the present disclosure, all of the one or more fields in the group may be same type.

According to some embodiments of the present disclosure, the confirmation MAC CE may include another type of a field.

According to some embodiments of the present disclosure, the confirmation MAC CE may be identified by a MAC subheader with a logical channel identifier (LCID).

According to some embodiments of the present disclosure, the multiple configured grants includes at least one of a configured grant Type 2 with sidelink configured grant index ($CG_i$) configured for a Medium Access Control (MAC) entity of the wireless device.

For example, at least one of the field in the bit group may indicate confirmation to activation or deactivation of the configured grant Type 2 with the sidelink configured grant index ($CG_i$).

According to some embodiments of the present disclosure, the confirmation MAC CE may consist of one octet.

According to some embodiments of the present disclosure, the stored a plurality of instructions may cause the wireless device to set a priority of the confirmation MAC CE as a highest priority of logical channels associated with the multiple configured grants.

According to some embodiments of the present disclosure, the stored a plurality of instructions may cause the wireless device to set a priority of the confirmation MAC CE as a highest priority of logical channels belonging to a destination associated with the multiple configured grants.

According to some embodiments of the present disclosure, the stored a plurality of instructions may cause the wireless device to be in communication with at least one of a user equipment, a network, or an autonomous vehicle other than the wireless device.

Hereinafter, a method for confirmation of multiple configured grants for sidelink performed by a base station (BS) in a wireless communication system, according to some embodiments of the present disclosure, will be described.

The BS may transmit, to a wireless device, configuration of multiple configured grants for sidelink. The BS may transmit activation command or deactivation command on Physical Downlink Control Channel (PDCCH) for at least one of the multiple configured grants. The BS may receive, from the wireless device, a confirmation Media Access Control (MAC) Control Element (CE). The confirmation MAC CE may include one or more fields in a bit group of which size is equal to number of the multiple configured grants. Each field in the bit group may be set to (i) zero to indicate deactivation for each of the multiple configured grants or (ii) 1 to indicate activation for each of the multiple configured grants. Each field in the confirmation MAC CE except the bit group may be ignored.

Hereinafter, a base station (BS) for confirmation of multiple configured grants for sidelink in a wireless communication system, according to some embodiments of the present disclosure, will be described.

The BS may include a transceiver, a memory, and a processor operatively coupled to the transceiver and the memory.

The processor may be configured to control the transceiver to transmit, to a wireless device, configuration of multiple configured grants for sidelink. The processor may be configured to control the transceiver to transmit activation command or deactivation command on Physical Downlink Control Channel (PDCCH) for at least one of the multiple configured grants. The processor may be configured to control the transceiver to receive, from the wireless device, a confirmation Media Access Control (MAC) Control Element (CE). The confirmation MAC CE may include one or more fields in a bit group of which size is equal to number of the multiple configured grants. Each field in the bit group may be set to (i) zero to indicate deactivation for each of the multiple configured grants or (ii) 1 to indicate activation for each of the multiple configured grants. Each field in the confirmation MAC CE except the bit group may be ignored.

The present disclosure can have various advantageous effects.

According to some embodiments of the present disclosure, a wireless device could confirm multiple configured grants for sidelink efficiently.

For example, a wireless device could efficiently confirm to activation or deactivation of a configured grant.

For example, a wireless device could confirm to activation or deactivation of a configured grant by using a MAC CE.

For example, a wireless device could efficiently allocate a resource for transmission of the configured grant.

For example, a wireless device could allocate a resource for transmission of the configured grant when the wireless device uses a configured grant for transmission.

According to some embodiments of the present disclosure, a wireless communication system could provide a method for efficiently confirming activation or deactivation for a configured grant for a wireless device performing transmission or reception.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device in a wireless communication system, the method comprising,
receiving, from a network, configuration of multiple configured grants for sidelink;
transmitting, to the network, a first Medium Access Control (MAC) protocol data unit (PDU) including a first Configured Grant Confirmation MAC Control Element (CE);
receiving activation command or deactivation command on Physical Downlink Control Channel (PDCCH) for at least one of the multiple configured grants;
triggering a specific configured grant confirmation upon receiving the activation command or the deactivation command, wherein the specific configured grant confirmation corresponds to the at least one of the multiple configured grants;
generating a second MAC PDU including a second Configured Grant Confirmation MAC CE,
wherein the second Configured Grant Confirmation MAC CE includes at least one confirmation up to a last event that triggered the first Configured Grant Confirmation MAC CE prior to the second MAC PDU;
canceling the triggered specific configured grant confirmation, which is prior to the second MAC PDU, based on that (i) a handover is performed, (ii) a serving cell change is performed, and/or (iii) a beam failure is detected; and
transmitting, to the network, the second MAC PDU including the second Configured Grant Confirmation MAC CE,
wherein the second Configured Grant Confirmation MAC CE includes one or more fields in a bit group of which size is equal to number of the multiple configured grants,
wherein each field in the bit group is set to (i) zero to indicate deactivation for each of the multiple configured grants or (ii) 1 to indicate activation for each of the multiple configured grants, and
wherein each field in the second Configured Grant Confirmation MAC CE except the bit group is ignored.

2. The method of claim 1, wherein the second Configured Grant Confirmation MAC CE includes at least one octet.

3. The method of claim 1, wherein all of the one or more fields in the bit group are same type.

4. The method of claim 1, wherein the second Configured Grant Confirmation MAC CE includes another type of a field.

5. The method of claim 1, wherein the second Configured Grant Confirmation MAC CE is identified by a MAC subheader with a logical channel identifier (LCD).

6. The method of claim 1, wherein the multiple configured grants includes at least one of a configured grant Type 2 with sidelink configured grant index ($CG_i$) configured for a Medium Access Control (MAC) entity of the wireless device.

7. The method of claim 6, wherein at least one of the field in the bit group indicates confirmation to activation or deactivation of the configured grant Type 2 with the sidelink configured grant index ($CG_i$).

8. The method of claim 1, wherein the second Configured Grant Confirmation MAC CE consists of one octet.

9. The method of claim 1, wherein the method further comprises,
setting a priority of the second Configured Grant Confirmation MAC CE as a highest priority of logical channels associated with the multiple configured grants.

10. The method of claim 1, wherein the method further comprises,
setting a priority of the second Configured Grant Confirmation MAC CE as a highest priority of logical channels belonging to a destination associated with the multiple configured grants.

11. The method of claim 1, wherein the wireless device is in communication with at least one of a user equipment, a network, or an autonomous vehicle other than the wireless device.

12. A wireless device in a wireless communication system comprising:
a transceiver;
a memory; and
at least one processor operatively coupled to the transceiver and the memory, and configured to:
control the transceiver to receive, from a network, configuration of multiple configured grants for sidelink;
control the transceiver to transmit, to the network, a first Medium Access Control (MAC) protocol data unit (PDU) including a first Configured Grant Confirmation MAC Control Element (CE);
control the transceiver to receive activation command or deactivation command on PDCCH for at least one of the multiple configured grants;
trigger a specific configured grant confirmation upon receiving the activation command or the deactivation command, wherein the specific configured grant confirmation corresponds to the at least one of the multiple configured grants;
generate a second MAC PDU including a second Configured Grant Confirmation MAC CE
wherein the second Configured Grant Confirmation MAC CE includes at least one confirmation up to a last event that triggered the first Configured Grant Confirmation MAC CE prior to the second MAC PDU;
cancel the triggered specific configured grant confirmation, which is prior to the second MAC PDU, based on that (i) a handover is performed, (ii) a serving cell change is performed, and/or (iii) a beam failure is detected; and
control the transceiver to transmit, to the network, a the second MAC PDU including the second Configured Grant Confirmation MAC CE,
wherein the second Configured Grant Confirmation MAC CE includes one or more fields in a bit group of which size is equal to number of the multiple configured grants,
wherein each field in the bit group is set to (i) zero to indicate deactivation for each of the multiple configured grants or (ii) 1 to indicate activation for each of the multiple configured grants, and
wherein each field in the second Configured Grant Confirmation MAC CE except the bit group is ignored.

13. The wireless device of claim 12, wherein the second Configured Grant Confirmation MAC CE includes at least one octet.

14. A processor for a wireless device in a wireless communication system, wherein the processor is configured to control the wireless device to perform operations comprising:

receiving, from a network, configuration of multiple configured grants for sidelink;

transmitting, to the network, a first Medium Access Control (MAC) protocol data unit (PDU) including a first Configured Grant Confirmation MAC Control Element (CE);

receiving activation command or deactivation command on Physical Downlink Control Channel (PDCCH) for at least one of the multiple configured grants;

triggering a specific configured grant confirmation upon receiving the activation command or the deactivation command, wherein the specific configured grant confirmation corresponds to the at least one of the multiple configured grants;

generating a second MAC PDU including a second Configured Grant Confirmation MAC CE, wherein the second Configured Grant Confirmation MAC CE includes at least one confirmation up to a last event that triggered the first Configured Grant Confirmation MAC CE prior to the second MAC PDU;

canceling the triggered specific configured grant confirmation, which is prior to the second MAC PDU, based on that (i) a handover is performed, (ii) a serving cell change is performed, and/or (iii) a beam failure is detected; and transmitting, to the network, the second MAC PDU including the second Configured Grant Confirmation, wherein the second Configured Grant Confirmation MAC CE includes one or more fields in a bit group of which size is equal to number of the multiple configured grants, wherein each field in the bit group is set to (i) zero to indicate deactivation for each of the multiple configured grants or (ii) 1 to indicate activation for each of the multiple configured grants, and wherein each field in the second Configured Grant Confirmation MAC CE except the bit group is ignored.

* * * * *